United States Patent
Zhu et al.

(10) Patent No.: US 9,762,912 B2
(45) Date of Patent: Sep. 12, 2017

(54) GRADUAL UPDATING USING TRANSFORM COEFFICIENTS FOR ENCODING AND DECODING

(71) Applicant: Microsoft Technology Licensing, LLC, Redmond, WA (US)

(72) Inventors: Lihua Zhu, Mountain View, CA (US); Shir Aharon, Mountain View, CA (US); Eric Rall, Sunnyvale, CA (US); B. Anil Kumar, Saratoga, CA (US); Jeroen E. van Eesteren, Palo Altos, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 310 days.

(21) Appl. No.: 14/598,668

(22) Filed: Jan. 16, 2015

(65) Prior Publication Data

US 2016/0212425 A1     Jul. 21, 2016

(51) Int. Cl.
| | |
|---|---|
| *H04N 19/12* | (2014.01) |
| *H04N 19/115* | (2014.01) |
| *H04N 19/18* | (2014.01) |
| *H04N 19/625* | (2014.01) |
| *H04N 19/88* | (2014.01) |
| *H04N 19/132* | (2014.01) |

(Continued)

(52) U.S. Cl.
CPC ........... *H04N 19/12* (2014.11); *H04N 19/115* (2014.11); *H04N 19/132* (2014.11); *H04N 19/146* (2014.11); *H04N 19/18* (2014.11); *H04N 19/187* (2014.11); *H04N 19/36* (2014.11); *H04N 19/625* (2014.11); *H04N 19/66* (2014.11); *H04N 19/88* (2014.11); *H04N 19/149* (2014.11)

(58) Field of Classification Search
CPC ...... H04N 19/12; H04N 19/115; H04N 19/18; H04N 19/625; H04N 19/88
USPC ........................... 375/240.03, 240.2, 240.24
See application file for complete search history.

(56) References Cited

U.S. PATENT DOCUMENTS

| | | |
|---|---|---|
| 6,031,572 A | 2/2000 | Christopoulos |
| 7,269,289 B2 | 9/2007 | Wu et al. |

(Continued)

OTHER PUBLICATIONS

Taieb, et al., "Progressive Coding and Side Information Updating for Distributed Video Coding", In Journal of Information Hiding and Multimedia Signal Processing, vol. 3, No. 1, Jan. 2013, 11 pages.

(Continued)

*Primary Examiner* — Neil Mikeska
(74) *Attorney, Agent, or Firm* — Klarquist Sparkman, LLP

(57) ABSTRACT

Innovations are provided for encoding and/or decoding video and/or image content using transform coefficient level gradual updating. Transform coefficient level gradual updating can be applied by encoding (or decoding) different subsets of the transform coefficients for the blocks, macroblocks, or other coding unit for each of a sequence of pictures. For example, a first subset of the transform coefficients of the blocks of a first picture can be encoded with the first picture, a second subset of the transform coefficients of the blocks of a second picture can be encoded with the second picture, and so on. A decoder can reconstruct pictures with increasing quality by receiving additional subsets of the transform coefficients.

16 Claims, 12 Drawing Sheets software 180 implementing one or more innovations for gradual updating using transform coefficients and/or progressive updating using groups of blocks

(51) Int. Cl.
H04N 19/146 (2014.01)
H04N 19/187 (2014.01)
H04N 19/36 (2014.01)
H04N 19/66 (2014.01)
H04N 19/149 (2014.01)

(56) References Cited

U.S. PATENT DOCUMENTS

| | | | |
|---|---|---|---|
| 7,782,954 | B2 | 8/2010 | Liang et al. |
| 8,107,527 | B1 | 1/2012 | Hobbs et al. |
| 2003/0223492 | A1 | 12/2003 | Drezner et al. |
| 2004/0066854 | A1 | 4/2004 | Hannuksela |
| 2006/0008002 | A1* | 1/2006 | Kirenko .............. H04N 19/176 375/240.11 |
| 2007/0253487 | A1 | 11/2007 | Kim et al. |
| 2009/0097566 | A1 | 4/2009 | Huang et al. |
| 2009/0175332 | A1* | 7/2009 | Karczewicz ......... H04N 19/176 375/240.03 |
| 2009/0274381 | A1 | 11/2009 | Kirenko |
| 2010/0034478 | A1* | 2/2010 | Kajiwara ............ H04N 19/176 382/248 |
| 2013/0028323 | A1* | 1/2013 | Miyoshi .............. H04N 19/126 375/240.13 |
| 2013/0188692 | A1* | 7/2013 | Chiu .................... H04N 19/159 375/240.03 |
| 2014/0023286 | A1* | 1/2014 | Du ....................... H04N 19/176 382/233 |
| 2014/0079116 | A1 | 3/2014 | Wang |
| 2014/0161367 | A1* | 6/2014 | Ridenour ............ H04N 19/115 382/233 |
| 2014/0185670 | A1 | 7/2014 | Wang |
| 2015/0078440 | A1* | 3/2015 | Novotny ............... H04N 19/60 375/240.03 |

OTHER PUBLICATIONS

Sullivan, et al., "Overview of the High Efficiency Video Coding (HEVC) Standard", In IEEE Transactions on Circuits and Systems for Video Technology, vol. 22, No. 12, Dec. 2012, 20 pages.

Malvar, Henrique S., "Multiresolution Transforms in Modern Image and Video Coding Systems", In Proceedings of SPIE—the International Society for Optical Engineering, Apr. 12, 2004, 9 pages.

Tran, et al., "Block Transforms in Progressive Image Coding", Retrieved on: Dec. 12, 2014 Available at: http://thanglong.ece.jhu.edu/Tran/Pub/appendix2.pdf.

Pereira, Fernando, "Advanced Video Coding", Retrieved on: Dec. 12, 2014 Available at: http://www.img.lx.it.pt/~/cav/ano2012_2013/Slides%202012-2013/CAV_8_Advanced_AV_Coding_2012-2013_Web.pdf.

Monro, et al., "Object Based Video with Progressive Foreground", In Proceedings of the International Conference on Image Processing, Oct. 26, 1997, 4 pages.

Taieb, et al., "Progressive Distributed Video Coding with Multiple Passes for Side Information Update", In 6th International Conference on Sciences of Electronics, Technologies of Information and Telecommunications, Mar. 21, 2012, 7 pages.

Buchner, et al., "Progressive Texture Video Coding", In IEEE International Conference on Acoustics, Speech, and Signal Processing, vol. 3, Mar. 7, 2001, 4 pages.

Gao, et al., "AVS—The Chinese Next-Generation Video Coding Standard", In Journal of National Association of Broadcasters, Apr. 2004, 10 pages.

Sullivan, "On Random Access and Bitstream Format for JVT Video," Joint Video Team (JVT) of ISO/IEC MPEG & ITU-T VCEG, JVT-b063, 2nd Meeting: Geneva, CH, Jan. 29-Feb. 1, 2002, Generated Jan. 23, 2002, 13 pages.

Schwarz et al., "Overview of the Scalable Video Coding Extension of the H.264/AVC Standard," IEEE Transactions on Circuits and Systems for Video Technology, vol. 17, No. 9, Sep. 2007, pp. 1103-1120.

"International Search Report and Written Opinion Issued in PCT Application No. PCT/US2016/013122", Mailed Date: Apr. 6, 2016, 15 Pages.

Roh, et al., "Data partitioning and coding of DCT coefficients based on requantization for error-resilient transmission of video", In Proceedings of the Signal Processing: Image Communication, vol. 17, No. 8, Sep. 1, 2002, pp. 573-585.

"Second Written Opinion Issued in PCT Application No. PCT/US2016/013122", Mailed Date: Jul. 21, 2016, 10 pages.

International Preliminary Report on Patentability, International Application No. PCT/US2016/013122, 11 pages, Sep. 21, 2016.

* cited by examiner software 180 implementing one or more
innovations for gradual updating using transform coefficients
and/or progressive updating using groups of blocks

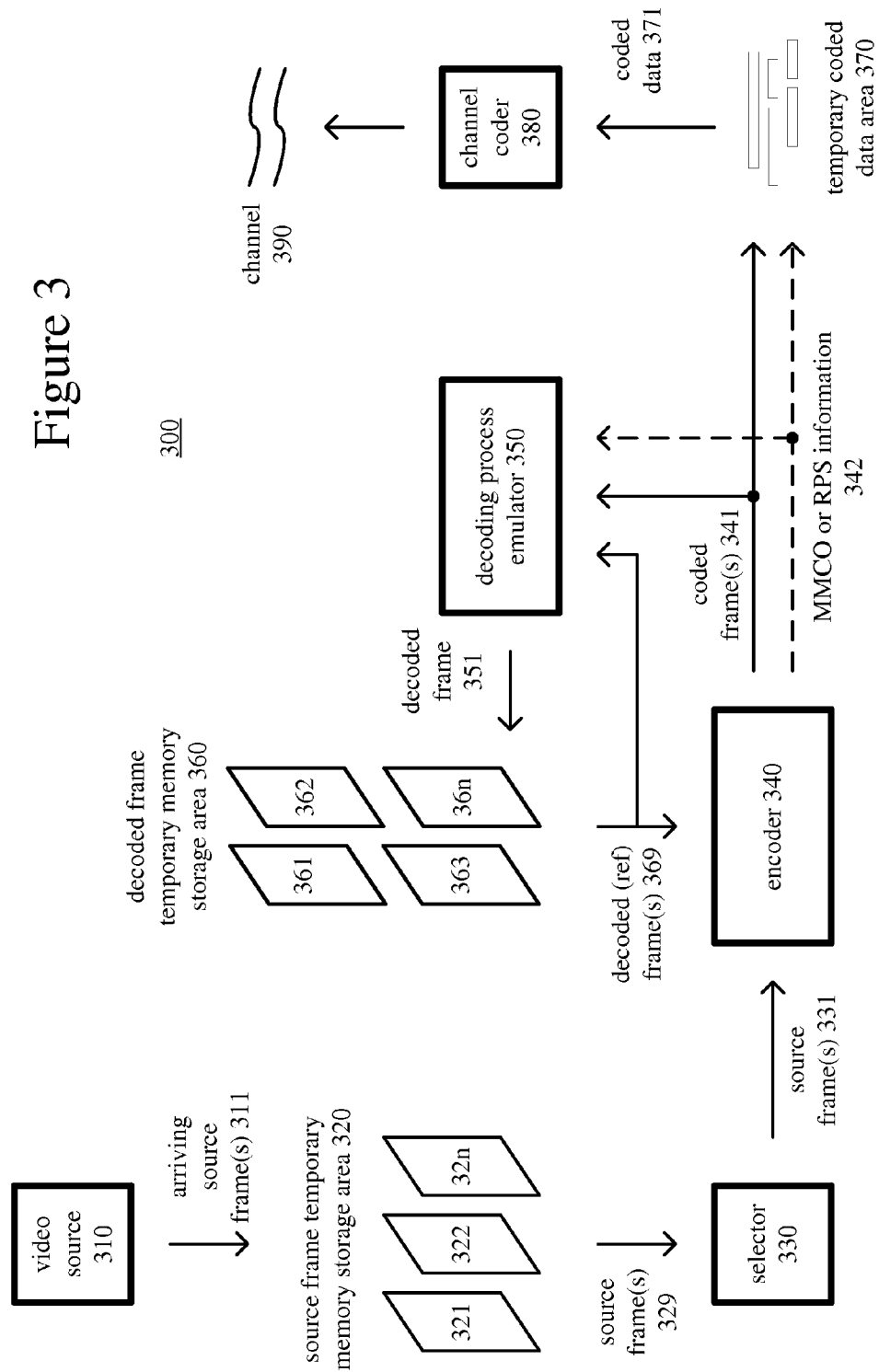

600

Figure 7
(Prior Art)
700
Transform coefficients for an 8x8 block 710
Zig-zag scan pattern 720
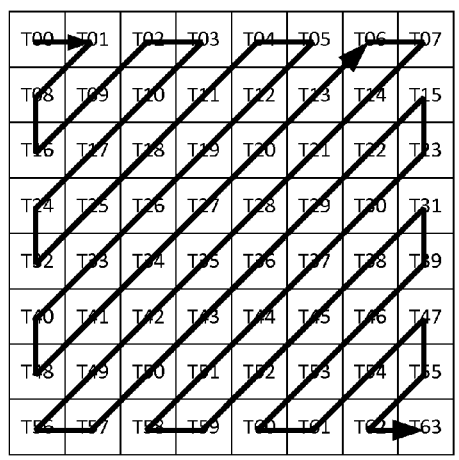
Horizontal scan pattern 730
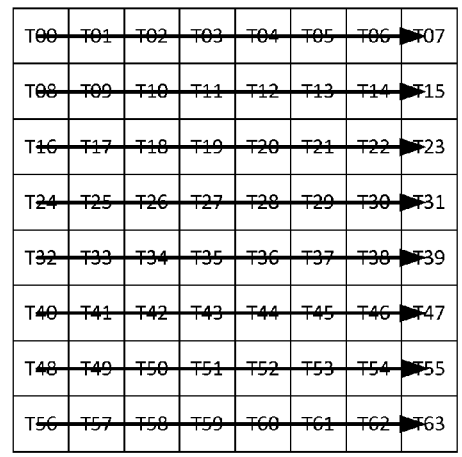

An 8x8 block of a first picture 810

| T00 | T01 | T02 | T03 | 0 | 0 | 0 | 0 |
|-----|-----|-----|-----|---|---|---|---|
| T08 | T09 | T10 | 0   | 0 | 0 | 0 | 0 |
| T16 | T17 | 0   | 0   | 0 | 0 | 0 | 0 |
| T24 | 0   | 0   | 0   | 0 | 0 | 0 | 0 |
| 0   | 0   | 0   | 0   | 0 | 0 | 0 | 0 |
| 0   | 0   | 0   | 0   | 0 | 0 | 0 | 0 |
| 0   | 0   | 0   | 0   | 0 | 0 | 0 | 0 |
| 0   | 0   | 0   | 0   | 0 | 0 | 0 | 0 |

Corresponding 8x8 block of a second picture 820

| 0/ | 0/ | 0/ | 0/ | T04 | T05 | 0 | 0 |
|-----|-----|-----|-----|-----|-----|---|---|
| 0/ | 0/ | 0/ | T11 | T12 | 0 | 0 | 0 |
| 0/ | 0/ | T18 | T19 | 0 | 0 | 0 | 0 |
| 0/ | T25 | T26 | 0 | 0 | 0 | 0 | 0 |
| T32 | T33 | 0 | 0 | 0 | 0 | 0 | 0 |
| T40 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |

Corresponding 8x8 block of a third picture 830

| 0/ | 0/ | 0/ | 0/ | 0/ | 0/ | T06 | T07 |
|-----|-----|-----|-----|-----|-----|-----|-----|
| 0/ | 0/ | 0/ | 0/ | 0/ | T13 | T14 | T15 |
| 0/ | 0/ | 0/ | 0/ | T20 | T21 | T22 | 0 |
| 0/ | 0/ | 0/ | T27 | T28 | T29 | 0 | 0 |
| 0/ | 0/ | T34 | T35 | T36 | 0 | 0 | 0 |
| 0/ | T41 | T42 | T43 | 0 | 0 | 0 | 0 |
| T48 | T49 | T50 | 0 | 0 | 0 | 0 | 0 |
| T56 | T57 | 0 | 0 | 0 | 0 | 0 | 0 |

Corresponding 8x8 block of a fourth picture 840

| 0/ | 0/ | 0/ | 0/ | 0/ | 0/ | 0/ | 0/ |
|-----|-----|-----|-----|-----|-----|-----|-----|
| 0/ | 0/ | 0/ | 0/ | 0/ | 0/ | 0/ | 0/ |
| 0/ | 0/ | 0/ | 0/ | 0/ | 0/ | 0/ | T23 |
| 0/ | 0/ | 0/ | 0/ | 0/ | 0/ | T30 | T31 |
| 0/ | 0/ | 0/ | 0/ | 0/ | T37 | T38 | T39 |
| 0/ | 0/ | 0/ | 0/ | T44 | T45 | T46 | T47 |
| 0/ | 0/ | 0/ | T51 | T52 | T53 | T54 | T55 |
| 0/ | 0/ | T58 | T59 | T60 | T61 | T62 | T63 |

An 8x8 block of a first picture 910

| T00 | T01 | T02 | T03 | T04 | T05 | T06 | T07 |
|-----|-----|-----|-----|-----|-----|-----|-----|
| T08 | T09 | T10 | T11 | T12 | T13 | T14 | T15 |
| T16 | T17 | T18 | T19 | T20 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |

Corresponding 8x8 block of a second picture 920

| 0 | 0 | 0 | 0 | 0 | 0 | 0 | 0 |
|-----|-----|-----|-----|-----|-----|-----|-----|
| 0 | 0 | 0 | 0 | 0 | 0 | 0 | 0 |
| 0 | 0 | 0 | 0 | 0 | T21 | T22 | T23 |
| T24 | T25 | T26 | T27 | T28 | T29 | T30 | T31 |
| T32 | T33 | T34 | T35 | T36 | T37 | T38 | T39 |
| T40 | T41 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |

Corresponding 8x8 block of a third picture 930

| 0 | 0 | 0 | 0 | 0 | 0 | 0 | 0 |
|-----|-----|-----|-----|-----|-----|-----|-----|
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | T42 | T43 | T44 | T45 | T46 | T47 |
| T48 | T49 | T50 | T51 | T52 | T53 | T54 | T55 |
| T56 | T57 | T58 | T59 | T60 | T61 | T62 | T63 |

1000

Coded block data for blocks of a picture 1010

Coefficient cutoff markers 1020

Groups of blocks for a first picture 1310

| QP35 | QP35 | QP35 | QP35 | QP35 | QP35 | QP35 |
|------|------|------|------|------|------|------|
| QP35 | QP35 | QP35 | QP35 | QP35 | QP35 | QP35 |
| QP35 | QP35 | QP35 | QP35 | QP35 | QP35 | QP35 |
| QP35 | QP35 | QP35 | QP35 | QP35 | QP35 | QP35 |
| QP35 | QP35 | QP35 | QP35 | QP35 | QP35 | QP35 |

Groups of blocks for a second picture 1320

| QP22 | QP22 | QP22 | QP35 | QP35 | QP35 | QP35 |
|------|------|------|------|------|------|------|
| QP35 | QP35 | QP35 | QP35 | QP35 | QP35 | QP35 |
| QP35 | QP35 | QP35 | QP35 | QP35 | QP35 | QP35 |
| QP35 | QP35 | QP35 | QP35 | QP35 | QP35 | QP35 |
| QP35 | QP35 | QP35 | QP35 | QP35 | QP35 | QP35 |

Groups of blocks for a third picture 1330

| QP22 | QP22 | QP22 | QP22 | QP22 | QP22 | QP22 |
|------|------|------|------|------|------|------|
| QP22 | QP22 | QP22 | QP22 | QP22 | QP22 | QP22 |
| QP22 | QP22 | QP22 | QP22 | QP22 | QP22 | QP22 |
| QP35 | QP35 | QP35 | QP35 | QP35 | QP35 | QP35 |
| QP35 | QP35 | QP35 | QP35 | QP35 | QP35 | QP35 |

Groups of blocks for a fourth picture 1340

| QP22 | QP22 | QP22 | QP22 | QP22 | QP22 | QP22 |
|------|------|------|------|------|------|------|
| QP22 | QP22 | QP22 | QP22 | QP22 | QP22 | QP22 |
| QP22 | QP22 | QP22 | QP22 | QP22 | QP22 | QP22 |
| QP22 | QP22 | QP22 | QP22 | QP22 | QP22 | QP22 |
| QP22 | QP22 | QP22 | QP22 | QP22 | QP22 | QP22 |

GRADUAL UPDATING USING TRANSFORM COEFFICIENTS FOR ENCODING AND DECODING

BACKGROUND

Engineers use compression (also called source coding or source encoding) to reduce the bit rate of digital video. Compression decreases the cost of storing and transmitting video information by converting the information into a lower bit rate form. Decompression (also called decoding) reconstructs a version of the original information from the compressed form. A "codec" is an encoder/decoder system.

Over the last two decades, various video codec standards have been adopted, including the ITU-T H.261, H.262 (MPEG-2 or ISO/IEC 13818-2), H.263 and H.264 (MPEG-4 AVC or ISO/IEC 14496-10) standards, the MPEG-1 (ISO/IEC 11172-2) and MPEG-4 Visual (ISO/IEC 14496-2) standards, and the SMPTE 421M standard. More recently, the HEVC standard (ITU-T H.265 or ISO/IEC 23008-2) has been approved. Extensions to the HEVC standard (e.g., for scalable video coding/decoding, for coding/decoding of video with higher fidelity in terms of sample bit depth or chroma sampling rate, or for multi-view coding/decoding) are currently under development. A video codec standard typically defines options for the syntax of an encoded video bitstream, detailing parameters in the bitstream when particular features are used in encoding and decoding. In many cases, a video codec standard also provides details about the decoding operations a decoder should perform to achieve conforming results in decoding. Aside from codec standards, various proprietary codec formats define other options for the syntax of an encoded video bitstream and corresponding decoding operations.

Encoding and decoding of specific types of content, such as screen content, can present different challenges from coding normal video content. For example, screen content can include areas of similar content (e.g., large graphical areas with the same color or a smooth gradient) and areas of repeated content. Screen content can also include content, or areas of content, that remain the same from one frame to the next. Encoding and decoding such content using normal video coding techniques can produce results that are inefficient and that reduce quality (e.g., by producing compression artifacts).

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Techniques are described for improving efficiency of encoding and/or decoding of video and/or image data. In some innovations, gradual updating is performed using transform coefficients. For example, transform coefficient level gradual updating can be applied by encoding (or decoding) only a subset of the transform coefficients for the blocks, macroblocks, or other coding unit of a given picture (e.g., a frame or a field). In this way, a first subset of the transform coefficients for the block (or other coding unit) can be sent with a first picture, a second subset (representing transform coefficients at different locations than the first subset) can be sent in a second picture, and so on (e.g., until all transform coefficients have been sent). The number of transform coefficients to encode (or decode) can be determined based on available bandwidth (e.g., based on a model of available bandwidth, which can also take into account a desired quantization parameter value). A decoder can reconstruct pictures with increasing quality by receiving additional subsets of the transform coefficients.

The technologies described herein can be applied to coding of screen content. Screen content refers to video and/or image content that is computer-generated (e.g., text, graphics, and/or other artificial content that is computer-generated). An example of screen content is an image of a computer desktop graphical user interface comprising text, icons, menus, windows, and/or other computer text and graphics. The technologies described herein can also be applied to content other than screen content.

The foregoing and other objects, features, and advantages of the invention will become more apparent from the following detailed description, which proceeds with reference to the accompanying figures.

BRIEF DESCRIPTION OF THE DRAWINGS

FIG. 3 is a diagram of an example encoder system in conjunction with which some described embodiments can be implemented.

FIG. 7 is a diagram illustrating example scan patterns for a block of transform coefficients.

FIG. 8 is a diagram illustrating an example of transform coefficient level gradual updating for a particular block over a sequence of frames according to a zig-zag scan pattern.

FIG. 9 is a diagram illustrating an example of transform coefficient level gradual updating for a particular block over a sequence of frames according to a horizontal scan pattern.

FIG. 13 is a diagram illustrating an example of progressive updating for groups of blocks over a sequence of pictures.

DETAILED DESCRIPTION

Figure 1:
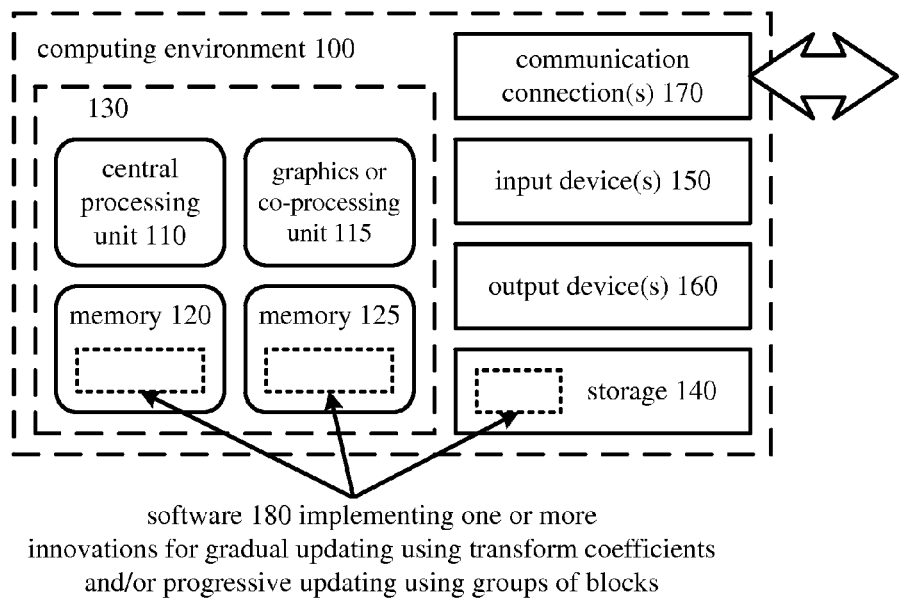
FIG. 1 is a diagram of an example computing system in which some described embodiments can be implemented.

The detailed description presents various innovations in gradual updating using transform coefficients. For example, transform coefficient level gradual updating can be applied by encoding (or decoding) only a subset of the transform coefficients for the blocks, macroblocks, or other coding unit of a given picture (e.g., a frame or a field). In this way, a first subset of the transform coefficients for the block, macroblock, or other coding unit, can be sent with a first picture, a second subset can be sent in a second picture, and so on (e.g., until all transform coefficients have been sent). The number of transform coefficients to encode (or decode) can be determined based on available bandwidth (e.g., based on a model of available bandwidth, which can also take into account a desired quantization parameter value). Innovations are also presented for progressive updating for groups of blocks over a sequence of pictures.

Some of these innovations improve efficiency and/or quality of encoding and/or decoding digital picture content (e.g., image content and/or video content). For example, gradual updating can be applied to produce a bitstream that conforms to available bandwidth and that that provides gradually increasing picture quality as additional transform coefficients are encoded (or decoded).

The technologies described herein can be applied to coding of screen content. Screen content refers to video and/or image content that is computer-generated (e.g., text, graphics, and/or other artificial content that is computer-generated). An example of screen content is an image of a computer desktop graphical user interface comprising text, icons, menus, windows, and/or other computer text and graphics. The technologies described herein can also be applied to content other than screen content (e.g., other types of digital video and/or image content).

Although operations described herein are in places described as being performed by a video encoder or video decoder, in many cases the operations can be performed by another type of media processing tool (e.g., digital image or digital picture encoder, digital image or digital picture decoder).

Some of the innovations described herein are illustrated with reference to syntax elements and operations specific to the HEVC standard. For example, reference is made to the draft version JCTVC-N1005 of the HEVC standard—"High Efficiency Video Coding (HEVC) Range Extensions Text Specification: Draft 4, " JCTVC-N1005, Jul. 2013. The innovations described herein can also be implemented for other standards or formats.

More generally, various alternatives to the examples described herein are possible. For example, some of the methods described herein can be altered by changing the ordering of the method acts described, by splitting, repeating, or omitting certain method acts, etc. The various aspects of the disclosed technology can be used in combination or separately. Different embodiments use one or more of the described innovations. Some of the innovations described herein address one or more of the problems noted in the background. Typically, a given technique/tool does not solve all such problems.

I. Example Computing Systems

FIG. 1 illustrates a generalized example of a suitable computing system (100) in which several of the described innovations may be implemented. The computing system (100) is not intended to suggest any limitation as to scope of use or functionality, as the innovations may be implemented in diverse general-purpose or special-purpose computing systems.

With reference to FIG. 1, the computing system (100) includes one or more processing units (110, 115) and memory (120, 125). The processing units (110, 115) execute computer-executable instructions. A processing unit can be a general-purpose central processing unit ("CPU"), processor in an application-specific integrated circuit ("ASIC") or any other type of processor. In a multi-processing system, multiple processing units execute computer-executable instructions to increase processing power. For example, FIG. 1 shows a central processing unit (110) as well as a graphics processing unit or co-processing unit (115). The tangible memory (120, 125) may be volatile memory (e.g., registers, cache, RAM), non-volatile memory (e.g., ROM, EEPROM, flash memory, etc.), or some combination of the two, accessible by the processing unit(s). The memory (120, 125) stores software (180) implementing one or more innovations for gradual updating using transform coefficients and/or progressive updating using groups of blocks, in the form of computer-executable instructions suitable for execution by the processing unit(s).

A computing system may have additional features. For example, the computing system (100) includes storage (140), one or more input devices (150), one or more output devices (160), and one or more communication connections (170). An interconnection mechanism (not shown) such as a bus, controller, or network interconnects the components of the computing system (100). Typically, operating system software (not shown) provides an operating environment for other software executing in the computing system (100), and coordinates activities of the components of the computing system (100).

The tangible storage (140) may be removable or non-removable, and includes magnetic disks, magnetic tapes or cassettes, CD-ROMs, DVDs, or any other medium which can be used to store information and which can be accessed within the computing system (100). The storage (140) stores instructions for the software (180) implementing one or more of the innovations described herein.

The input device(s) (150) may be a touch input device such as a keyboard, mouse, pen, or trackball, a voice input device, a scanning device, or another device that provides input to the computing system (100). For video, the input device(s) (150) may be a camera, video card, TV tuner card, or similar device that accepts video input in analog or digital form, or a CD-ROM or CD-RW that reads video samples into the computing system (100). The output device(s) (160) may be a display, printer, speaker, CD-writer, or another device that provides output from the computing system (100).

The communication connection(s) (170) enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Any of the disclosed innovations can be implemented as computer-executable instructions or a computer program product stored on one or more computer-readable storage media and executed on a computing device (e.g., any available computing device, including smart phones or other mobile devices that include computing hardware). Computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example and with reference to FIG. 1, computer-readable storage media include memory 1020 and 1025, and storage 1040. The term computer-readable storage media does not include signals and carrier waves. In addition, the term computer-readable storage media does not include communication connections (e.g., 170).

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

The disclosed methods can also be implemented using specialized computing hardware configured to perform any of the disclosed methods. For example, the disclosed methods can be implemented by an integrated circuit (e.g., an ASIC (such as an ASIC digital signal process unit ("DSP"), a graphics processing unit ("GPU"), or a programmable logic device ("PLD"), such as a field programmable gate array ("FPGA")) specially designed or configured to implement any of the disclosed methods.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

II. Example Network Environments

Figure 2A:
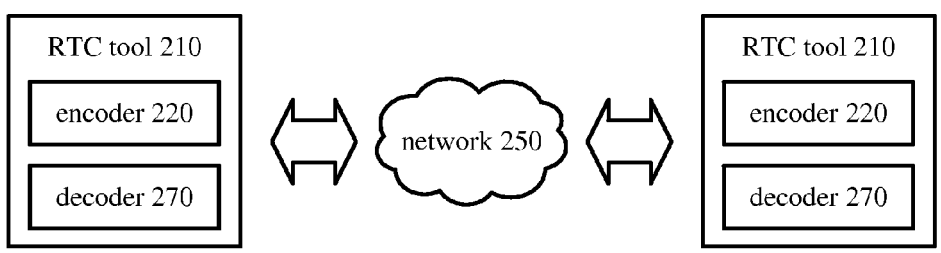
FIGS. 2a and 2b are diagrams of example network environments in which some described embodiments can be implemented.
Figure 2B:
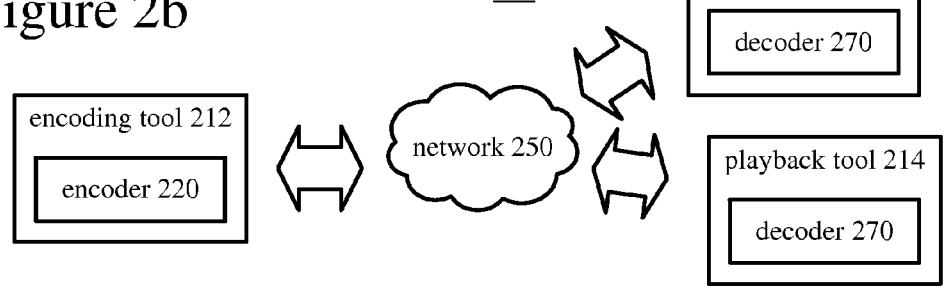

FIGS. 2a and 2b show example network environments (201, 202) that include video encoders (220) and video decoders (270). The encoders (220) and decoders (270) are connected over a network (250) using an appropriate communication protocol. The network (250) can include the Internet or another computer network.

In the network environment (201) shown in FIG. 2a, each real-time communication ("RTC") tool (210) includes both an encoder (220) and a decoder (270) for bidirectional communication. A given encoder (220) can produce output compliant with a variation or extension of the HEVC standard, SMPTE 421M standard, ISO-IEC 14496-10standard (also known as H.264 or AVC), another standard, or a proprietary format, with a corresponding decoder (270) accepting encoded data from the encoder (220). The bidirectional communication can be part of a video conference, video telephone call, or other two-party communication scenario. Although the network environment (201) in FIG. 2a includes two real-time communication tools (210), the network environment (201) can instead include three or more real-time communication tools (210) that participate in multi-party communication.

Figure 4:
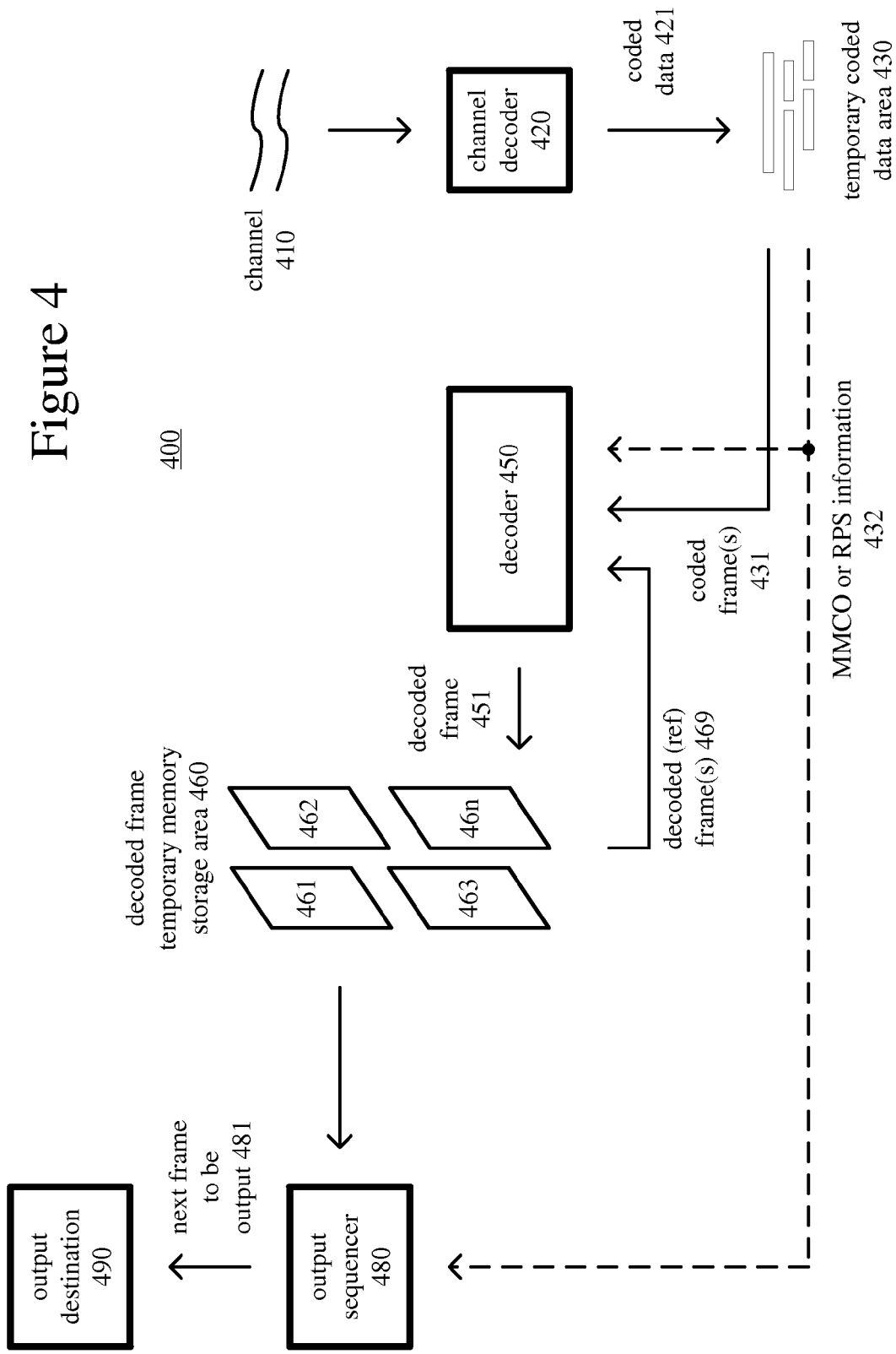
FIG. 4 is a diagram of an example decoder system in conjunction with which some described embodiments can be implemented.

A real-time communication tool (210) manages encoding by an encoder (220). FIG. 3 shows an example encoder system (300) that can be included in the real-time communication tool (210). Alternatively, the real-time communication tool (210) uses another encoder system. A real-time communication tool (210) also manages decoding by a decoder (270). FIG. 4 shows an example decoder system (400), which can be included in the real-time communication tool (210). Alternatively, the real-time communication tool (210) uses another decoder system.

In the network environment (202) shown in FIG. 2b, an encoding tool (212) includes an encoder (220) that encodes video for delivery to multiple playback tools (214), which include decoders (270). The unidirectional communication can be provided for a video surveillance system, web camera monitoring system, remote desktop conferencing presentation or other scenario in which video is encoded and sent from one location to one or more other locations. Although the network environment (202) in FIG. 2b includes two playback tools (214), the network environment (202) can include more or fewer playback tools (214). In general, a playback tool (214) communicates with the encoding tool (212) to determine a stream of video for the playback tool (214) to receive. The playback tool (214) receives the stream, buffers the received encoded data for an appropriate period, and begins decoding and playback.

FIG. 3 shows an example encoder system (300) that can be included in the encoding tool (212). Alternatively, the encoding tool (212) uses another encoder system. The encoding tool (212) can also include server-side controller logic for managing connections with one or more playback tools (214). FIG. 4 shows an example decoder system (400), which can be included in the playback tool (214). Alternatively, the playback tool (214) uses another decoder system. A playback tool (214) can also include client-side controller logic for managing connections with the encoding tool (212).

III. Example Encoder Systems

FIG. 3 is a block diagram of an example encoder system (300) in conjunction with which some described embodiments may be implemented. The encoder system (300) can be a general-purpose encoding tool capable of operating in any of multiple encoding modes such as a low-latency encoding mode for real-time communication, transcoding mode, and regular encoding mode for media playback from a file or stream, or it can be a special-purpose encoding tool adapted for one such encoding mode. The encoder system (300) can be implemented as an operating system module, as part of an application library or as a standalone application. Overall, the encoder system (300) receives a sequence of source video frames (311) from a video source (310) and produces encoded data as output to a channel (390). The encoded data output to the channel can include content encoded using transform coefficient level gradual updating and/or progressive updating using groups of blocks.

The video source (310) can be a camera, tuner card, storage media, or other digital video source. The video source (310) produces a sequence of video frames at a frame rate of, for example, 30 frames per second. As used herein, the term "frame" generally refers to source, coded or reconstructed image data. For progressive video, a frame is a progressive video frame. For interlaced video, in example embodiments, an interlaced video frame is de-interlaced prior to encoding. Alternatively, two complementary interlaced video fields are encoded as an interlaced video frame or separate fields. Aside from indicating a progressive video frame, the term "frame" or "picture" can indicate a single non-paired video field, a complementary pair of video fields, a video object plane that represents a video object at a given time, or a region of interest in a larger image. The video object plane or region can be part of a larger image that includes multiple objects or regions of a scene.

An arriving source frame (311) is stored in a source frame temporary memory storage area (320) that includes multiple frame buffer storage areas (321, 322, . . . , 32n). A frame buffer (321, 322, etc.) holds one source frame in the source frame storage area (320). After one or more of the source frames (311) have been stored in frame buffers (321, 322, etc.), a frame selector (330) periodically selects an individual source frame from the source frame storage area (320). The order in which frames are selected by the frame selector (330) for input to the encoder (340) may differ from the order in which the frames are produced by the video source (310), e.g., a frame may be ahead in order, to facilitate temporally backward prediction. Before the encoder (340), the encoder system (300) can include a pre-processor (not shown) that performs pre-processing (e.g., filtering) of the selected frame (331) before encoding. The pre-processing can also include color space conversion into primary and secondary components for encoding. Typically, before encoding, video has been converted to a color space such as YUV, in which sample values of a luma (Y) component represent brightness or intensity values, and sample values of chroma (U, V) components represent color-difference values. The chroma sample values may be sub-sampled to a lower chroma sampling rate (e.g., for YUV 4:2:0 format), or the chroma sample values may have the same resolution as the luma sample values (e.g., for YUV 4:4:4 format). Or, the video can be encoded in another format (e.g., RGB 4:4:4 format).

The encoder (340) encodes the selected frame (331) to produce a coded frame (341) and also produces memory management control operation ("MMCO") signals (342) or reference picture set ("RPS") information. If the current frame is not the first frame that has been encoded, when performing its encoding process, the encoder (340) may use one or more previously encoded/decoded frames (369) that have been stored in a decoded frame temporary memory storage area (360). Such stored decoded frames (369) are used as reference frames for inter-frame prediction of the content of the current source frame (331). Generally, the encoder (340) includes multiple encoding modules that perform encoding tasks such as partitioning into tiles, intra prediction estimation and prediction, motion estimation and compensation, frequency transforms, quantization and entropy coding. The exact operations performed by the encoder (340) can vary depending on compression format. The format of the output encoded data can be a variation or extension of HEVC format, Windows Media Video format, VC-1 format, MPEG-x format (e.g., MPEG-1, MPEG-2, or MPEG-4), H.26x format (e.g., H.261, H.262, H.263, H.2649), or another format.

The encoder (340) can partition a frame into multiple tiles of the same size or different sizes. For example, the encoder (340) splits the frame along tile rows and tile columns that, with frame boundaries, define horizontal and vertical boundaries of tiles within the frame, where each tile is a rectangular region. Tiles are often used to improve options for parallel processing. A frame can also be organized as one or more slices, where a slice can be an entire frame or region of the frame. A slice can be decoded independently of other slices in a frame, which improves error resilience. The content of a slice or tile is further partitioned into blocks or other sets of samples for purposes of encoding and decoding.

For syntax according to the HEVC standard, the encoder splits the content of a frame (or slice or tile) into coding tree units. A coding tree unit ("CTU") includes luma sample values organized as a luma coding tree block ("CTB") and corresponding chroma sample values organized as two chroma CTBs. The size of a CTU (and its CTBs) is selected by the encoder, and can be, for example, 64×64, 32×32 or 16×16 sample values. A CTU includes one or more coding units. A coding unit ("CU") has a luma coding block ("CB") and two corresponding chroma CBs. For example, a CTU with a 64×64 luma CTB and two 64×64 chroma CTBs (YUV 4:4:4 format) can be split into four CUs, with each CU including a 32×32 luma CB and two 32×32 chroma CBs, and with each CU possibly being split further into smaller CUs. Or, as another example, a CTU with a 64×64 luma CTB and two 32×32 chroma CTBs (YUV 4:2:0 format) can be split into four CUs, with each CU including a 32×32 luma CB and two 16×16 chroma CBs, and with each CU possibly being split further into smaller CUs. The smallest allowable size of CU (e.g., 8×8, 16×16) can be signaled in the bitstream.

Generally, a CU has a prediction mode such as inter or intra. A CU includes one or more prediction units for purposes of signaling of prediction information (such as prediction mode details, etc.) and/or prediction processing. A prediction unit ("PU") has a luma prediction block ("PB") and two chroma PBs. For an intra-predicted CU, the PU has the same size as the CU, unless the CU has the smallest size (e.g., 8×8). In that case, the CU can be split into four smaller PUs (e.g., each 4×4 if the smallest CU size is 8×8) or the PU can have the smallest CU size, as indicated by a syntax element for the CU. A CU also has one or more transform units for purposes of residual coding/decoding, where a transform unit ("TU") has a transform block ("TB") and two chroma TBs. A PU in an intra-predicted CU may contain a single TU (equal in size to the PU) or multiple TUs. As used herein, the term "block" can indicate a CU, CB, PB, TB or other set of sample values, depending on context. The encoder decides how to partition video into CTUs, CUs, PUs, TUs, etc.

Returning to FIG. 3, the encoder represents an intra-coded block of a source frame (331) in terms of prediction from other, previously reconstructed sample values in the frame (331). For intra spatial prediction for a block, the intra-picture estimator estimates extrapolation of the neighboring reconstructed sample values into the block. The intra-prediction estimator outputs prediction information (such as prediction mode (direction) for intra spatial prediction), which is entropy coded. An intra-prediction predictor applies the prediction information to determine intra prediction values.

For the transform coefficient level gradual updating techniques described herein, the encoder (340) can encode a frame using a subset of transform coefficients for blocks of the frame (e.g., where a coefficient cutoff marker is encoded to indicate which transform coefficients are encoded for the blocks). Subsequent frames can encode other subsets of the transform coefficients for corresponding blocks (e.g., a next portion of the transform coefficients in an order according to a scan pattern).

The encoder (340) represents an inter-coded, predicted block of a source frame (331) in terms of prediction from reference frames. A motion estimator estimates motion of the block with respect to one or more reference frames (369). When multiple reference frames are used, the multiple reference frames can be from different temporal directions or the same temporal direction. A motion-compensated prediction reference region is a region of samples in the reference frame(s) that are used to generate motion-compensated prediction values for a block of samples of a current frame. The motion estimator outputs motion information such as motion vector information, which is entropy coded. A motion compensator applies motion vectors to reference frames (369) to determine motion-compensated prediction values.

The entropy coder of the encoder (340) compresses quantized transform coefficient values as well as certain side information (e.g., motion vector information, QP values, mode decisions, parameter choices). In particular, the entropy coder can compress data for elements of an index map using a coefficient coding syntax structure. Typical entropy coding techniques include Exp-Golomb coding, arithmetic coding, differential coding, Huffman coding, run length coding, variable-length-to-variable-length ("V2V") coding, variable-length-to-fixed-length ("V2F") coding, LZ coding, dictionary coding, probability interval partitioning entropy coding ("PIPE"), and combinations of the above. The entropy coder can use different coding techniques for different kinds of information, and can choose from among multiple code tables within a particular coding technique.

The coded frames (341) and MMCO/RPS information (342) are processed by a decoding process emulator (350). The decoding process emulator (350) implements some of the functionality of a decoder, for example, decoding tasks to reconstruct reference frames. The decoding process emulator (350) uses the MMCO/RPS information (342) to determine whether a given coded frame (341) needs to be reconstructed and stored for use as a reference frame in inter-frame prediction of subsequent frames to be encoded. If the MMCO/RPS information (342) indicates that a coded frame (341) needs to be stored, the decoding process emulator (350) models the decoding process that would be conducted by a decoder that receives the coded frame (341) and produces a corresponding decoded frame (351). In doing so, when the encoder (340) has used decoded frame(s) (369) that have been stored in the decoded frame storage area (360), the decoding process emulator (350) also uses the decoded frame(s) (369) from the storage area (360) as part of the decoding process.

The decoded frame temporary memory storage area (360) includes multiple frame buffer storage areas (361, 362, . . . , 36n). The decoding process emulator (350) uses the MMCO/RPS information (342) to manage the contents of the storage area (360) in order to identify any frame buffers (361, 362, etc.) with frames that are no longer needed by the encoder (340) for use as reference frames. After modeling the decoding process, the decoding process emulator (350) stores a newly decoded frame (351) in a frame buffer (361, 362, etc.) that has been identified in this manner.

The coded frames (341) and MMCO/RPS information (342) are buffered in a temporary coded data area (370). The coded data that is aggregated in the coded data area (370) contains, as part of the syntax of an elementary coded video bitstream, encoded data for one or more pictures. The coded data that is aggregated in the coded data area (370) can also include media metadata relating to the coded video data (e.g., as one or more parameters in one or more supplemental enhancement information ("SEI") messages or video usability information ("VUI") messages).

The aggregated data (371) from the temporary coded data area (370) are processed by a channel encoder (380). The channel encoder (380) can packetize the aggregated data for transmission as a media stream (e.g., according to a media stream multiplexing format such as ISO/IEC 13818-1), in which case the channel encoder (380) can add syntax elements as part of the syntax of the media transmission stream. Or, the channel encoder (380) can organize the aggregated data for storage as a file (e.g., according to a media container format such as ISO/IEC 14496-12), in which case the channel encoder (380) can add syntax elements as part of the syntax of the media storage file. Or, more generally, the channel encoder (380) can implement one or more media system multiplexing protocols or transport protocols, in which case the channel encoder (380) can add syntax elements as part of the syntax of the protocol(s). The channel encoder (380) provides output to a channel (390), which represents storage, a communications connection, or another channel for the output.

IV. Example Decoder Systems

FIG. 4 is a block diagram of an example decoder system (400) in conjunction with which some described embodiments may be implemented. The decoder system (400) can be a general-purpose decoding tool capable of operating in any of multiple decoding modes such as a low-latency decoding mode for real-time communication and regular decoding mode for media playback from a file or stream, or it can be a special-purpose decoding tool adapted for one such decoding mode. The decoder system (400) can be implemented as an operating system module, as part of an application library or as a standalone application. Overall, the decoder system (400) receives coded data from a channel (410) and produces reconstructed frames as output for an output destination (490). The coded data can include content encoded using transform coefficient level gradual updating and/or progressive updating using groups of blocks.

The decoder system (400) includes a channel (410), which can represent storage, a communications connection, or another channel for coded data as input. The channel (410) produces coded data that has been channel coded. A channel decoder (420) can process the coded data. For example, the channel decoder (420) de-packetizes data that has been aggregated for transmission as a media stream (e.g., according to a media stream multiplexing format such as ISO/IEC 13818-1), in which case the channel decoder (420) can parse syntax elements added as part of the syntax of the media transmission stream. Or, the channel decoder (420) separates coded video data that has been aggregated for storage as a file (e.g., according to a media container format such as ISO/IEC 14496-12), in which case the channel decoder (420) can parse syntax elements added as part of the syntax of the media storage file. Or, more generally, the channel decoder (420) can implement one or more media system demultiplexing protocols or transport protocols, in which case the channel decoder (420) can parse syntax elements added as part of the syntax of the protocol(s).

The coded data (421) that is output from the channel decoder (420) is stored in a temporary coded data area (430) until a sufficient quantity of such data has been received. The coded data (421) includes coded frames (431) and MMCO/RPS information (432). The coded data (421) in the coded data area (430) contain, as part of the syntax of an elementary coded video bitstream, coded data for one or more pictures. The coded data (421) in the coded data area (430) can also include media metadata relating to the encoded video data (e.g., as one or more parameters in one or more SEI messages or VUI messages).

In general, the coded data area (430) temporarily stores coded data (421) until such coded data (421) is used by the decoder (450). At that point, coded data for a coded frame (431) and MMCO/RPS information (432) are transferred from the coded data area (430) to the decoder (450). As decoding continues, new coded data is added to the coded data area (430) and the oldest coded data remaining in the coded data area (430) is transferred to the decoder (450).

The decoder (450) periodically decodes a coded frame (431) to produce a corresponding decoded frame (451). As appropriate, when performing its decoding process, the decoder (450) may use one or more previously decoded frames (469) as reference frames for inter-frame prediction. The decoder (450) reads such previously decoded frames (469) from a decoded frame temporary memory storage area (460). Generally, the decoder (450) includes multiple decoding modules that perform decoding tasks such as entropy decoding, inverse quantization, inverse frequency transforms, intra prediction, motion compensation and merging of tiles. The exact operations performed by the decoder (450) can vary depending on compression format.

For example, the decoder (450) receives encoded data for a compressed frame or sequence of frames and produces output including decoded frame (451). In the decoder (450), a buffer receives encoded data for a compressed frame and, at an appropriate time, makes the received encoded data available to an entropy decoder. The entropy decoder entropy decodes entropy-coded quantized data as well as entropy-coded side information, typically applying the inverse of entropy encoding performed in the encoder. A motion compensator applies motion information to one or more reference frames to form motion-compensated prediction values for any inter-coded blocks of the frame being reconstructed. An intra prediction module can spatially predict sample values of a current block from neighboring, previously reconstructed sample values.

For the transform coefficient level gradual updating techniques described herein, the decoder (451) can decode a frame using a subset of available quantized transform coefficients for blocks of the frame (e.g., where the quantized transform coefficients for the blocks are indicated by a coefficient cutoff marker) and reconstruct the frame. Subsequent frames can provide other subsets of the available quantized transform coefficients for corresponding blocks (e.g., a next portion of the quantized transform coefficients in an order according to a scan pattern) which can be decoded and used with the previously decoded transform coefficients to reconstruct the subsequent frames.

The decoder (450) also reconstructs prediction residuals. An inverse quantizer inverse quantizes entropy-decoded data. For example, the decoder (450) sets values for QP for a picture, tile, slice and/or other portion of video based on syntax elements in the bitstream, and inverse quantizes transform coefficients accordingly. An inverse frequency transformer converts the quantized, frequency domain data into spatial domain information. For an inter-predicted block, the decoder (450) combines reconstructed prediction residuals with motion-compensated predictions. The decoder (450) can similarly combine prediction residuals with predictions from intra prediction. A motion compensation loop in the video decoder (450) includes an adaptive de-blocking filter to smooth discontinuities across block boundary rows and/or columns in the decoded frame (451).

The decoded frame temporary memory storage area (460) includes multiple frame buffer storage areas (461, 462, . . . , 46n). The decoded frame storage area (460) is an example of a decoded picture buffer. The decoder (450) uses the MMCO/RPS information (432) to identify a frame buffer (461, 462, etc.) in which it can store a decoded frame (451). The decoder (450) stores the decoded frame (451) in that frame buffer.

An output sequencer (480) uses the MMCO/RPS information (432) to identify when the next frame to be produced in output order is available in the decoded frame storage area (460). When the next frame (481) to be produced in output order is available in the decoded frame storage area (460), it is read by the output sequencer (480) and output to the output destination (490) (e.g., display). In general, the order in which frames are output from the decoded frame storage area (460) by the output sequencer (480) may differ from the order in which the frames are decoded by the decoder (450).

V. Example Video Encoders

Figure 5A:
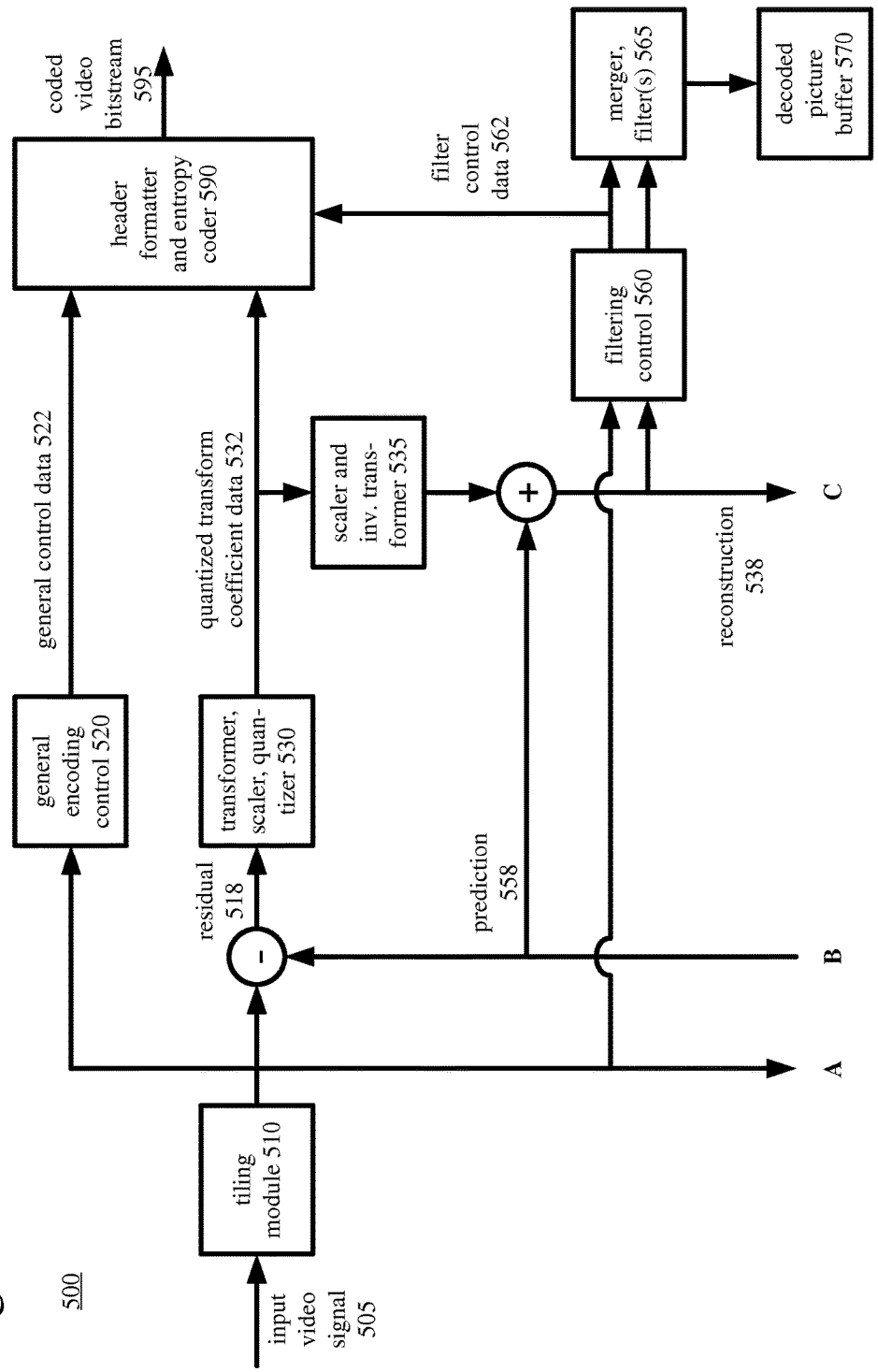
FIGS. 5a and 5b are diagrams illustrating an example video encoder in conjunction with which some described embodiments can be implemented.
Figure 5B:
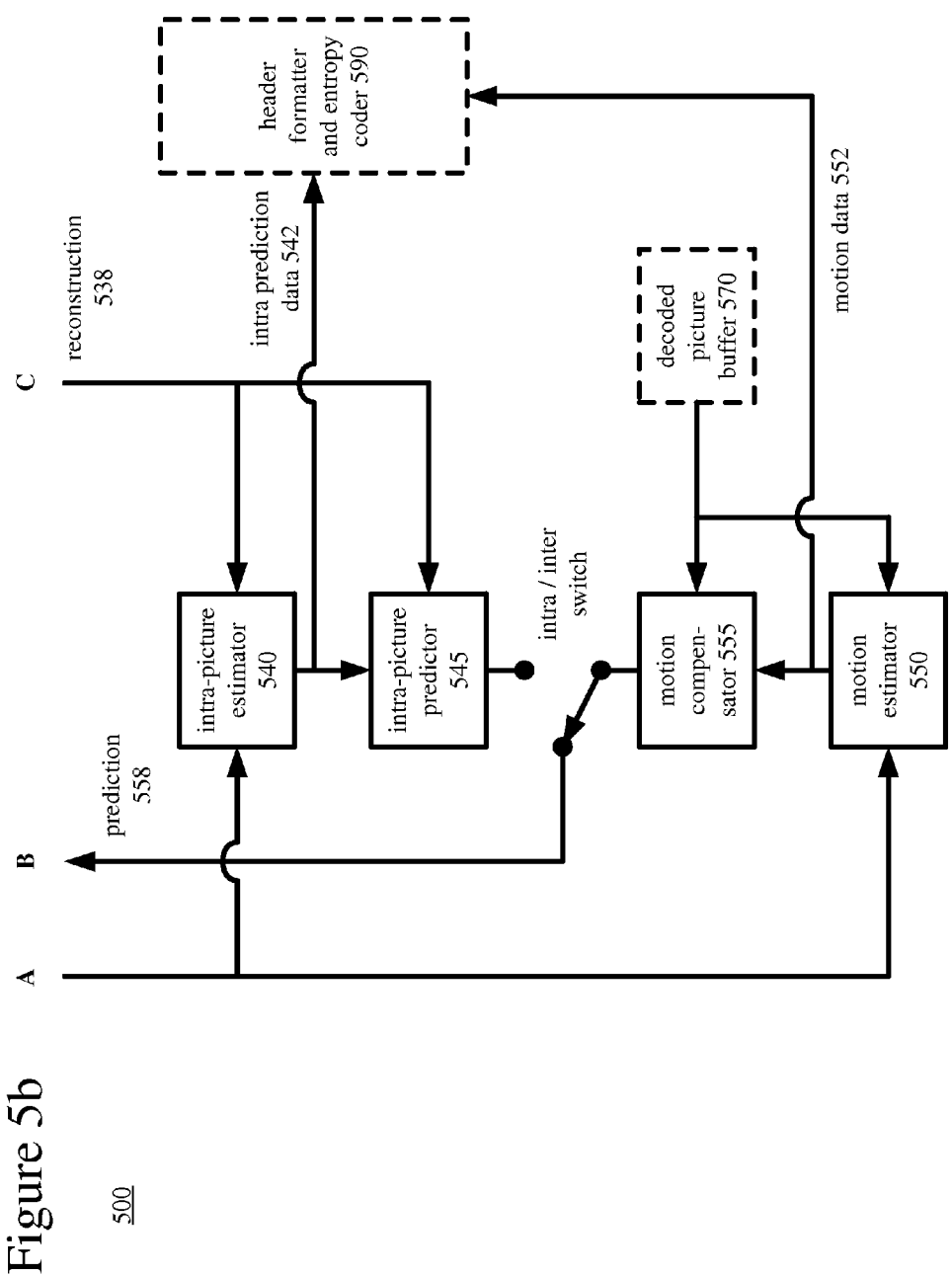

FIGS. 5a and 5b are a block diagram of a generalized video encoder (500) in conjunction with which some described embodiments may be implemented. The encoder (500) receives a sequence of video pictures including a current picture as an input video signal (505) and produces encoded data in a coded video bitstream (595) as output.

The encoder (500) is block-based and uses a block format that depends on implementation. Blocks may be further sub-divided at different stages, e.g., at the prediction, frequency transform and/or entropy encoding stages. For example, a picture can be divided into 64×64 blocks, 32×32 blocks or 16×16 blocks, which can in turn be divided into smaller blocks of sample values for coding and decoding. In implementations of encoding for the HEVC standard, the encoder partitions a picture into CTUs (CTBs), CUs (CBs), PUs (PBs) and TU (TB s).

The encoder (500) compresses pictures using intra-picture coding and/or inter-picture coding. Many of the components of the encoder (500) are used for both intra-picture coding and inter-picture coding. The exact operations performed by those components can vary depending on the type of information being compressed.

A tiling module (510) optionally partitions a picture into multiple tiles of the same size or different sizes. For example, the tiling module (510) splits the picture along tile rows and tile columns that, with picture boundaries, define horizontal and vertical boundaries of tiles within the picture, where each tile is a rectangular region. The tiling module (510) can then group the tiles into one or more tile sets, where a tile set is a group of one or more of the tiles.

The general encoding control (520) receives pictures for the input video signal (505) as well as feedback (not shown) from various modules of the encoder (500). Overall, the general encoding control (520) provides control signals (not shown) to other modules (such as the tiling module (510), transformer/scaler/quantizer (530), scaler/inverse transformer (535), intra-picture estimator (540), motion estimator (550) and intra/inter switch) to set and change coding parameters during encoding. In particular, the general encoding control (520) can decide whether and how to use dictionary modes during encoding. The general encoding control (520) can also evaluate intermediate results during encoding, for example, performing rate-distortion analysis. The general encoding control (520) produces general control data (522) that indicates decisions made during encoding, so that a corresponding decoder can make consistent decisions. The general control data (522) is provided to the header formatter/entropy coder (590).

If the current picture is predicted using inter-picture prediction, a motion estimator (550) estimates motion of blocks of sample values of the current picture of the input video signal (505) with respect to one or more reference pictures. The decoded picture buffer (570) buffers one or more reconstructed previously coded pictures for use as reference pictures. When multiple reference pictures are used, the multiple reference pictures can be from different temporal directions or the same temporal direction. The motion estimator (550) produces as side information motion data (552) such as motion vector data and reference picture selection data. The motion data (552) is provided to the header formatter/entropy coder (590) as well as the motion compensator (555).

The motion compensator (555) applies motion vectors to the reconstructed reference picture(s) from the decoded picture buffer (570). The motion compensator (555) produces motion-compensated predictions for the current picture.

In a separate path within the encoder (500), an intra-picture estimator (540) determines how to perform intra-picture prediction for blocks of sample values of a current picture of the input video signal (505). The current picture can be entirely or partially coded using intra-picture coding. Using values of a reconstruction (538) of the current picture, for intra spatial prediction, the intra-picture estimator (540) determines how to spatially predict sample values of a current block of the current picture from neighboring, previously reconstructed sample values of the current picture.

For the transform coefficient level gradual updating techniques described herein, the encoder (500) can encode a frame using a subset of transform coefficients for blocks of the frame (e.g., where a coefficient cutoff marker is encoded to indicate which transform coefficients are encoded for the blocks). Subsequent frames can encode other subsets of the transform coefficients for corresponding blocks (e.g., a next portion of the transform coefficients in an order according to a scan pattern).

The intra-prediction estimator (540) produces as side information intra prediction data (542), such as information indicating whether intra prediction uses spatial prediction or one of the various dictionary modes (e. g. , a flag value per intra block or per intra block of certain prediction mode directions), prediction mode direction (for intra spatial prediction). The intra prediction data (542) is provided to the header formatter/entropy coder (590) as well as the intra-picture predictor (545). According to the intra prediction data (542), the intra-picture predictor (545) spatially predicts sample values of a current block of the current picture from neighboring, previously reconstructed sample values of the current picture.

The intra/inter switch selects values of a motion-compensated prediction or intra-picture prediction for use as the prediction (558) for a given block. In non-dictionary modes, the difference (if any) between a block of the prediction (558) and corresponding part of the original current picture of the input video signal (505) provides values of the residual (518). During reconstruction of the current picture, reconstructed residual values are combined with the prediction (558) to produce a reconstruction (538) of the original content from the video signal (505). In lossy compression, however, some information is still lost from the video signal (505).

In the transformer/scaler/quantizer (530), for non-dictionary modes, a frequency transformer converts spatial domain video information into frequency domain (i. e. , spectral, transform) data. For block-based video coding, the frequency transformer applies a discrete cosine transform ("DCT"), an integer approximation thereof, or another type of forward block transform to blocks of prediction residual data (or sample value data if the prediction (558) is null), producing blocks of frequency transform coefficients. The encoder (500) may also be able to indicate that such transform step is skipped. The scaler/quantizer scales and quantizes the transform coefficients. For example, the quantizer applies non-uniform, scalar quantization to the frequency domain data with a step size that varies on a frame-by-frame basis, tile-by-tile basis, slice-by-slice basis, block-by-block basis or other basis. The quantized transform coefficient data (532) is provided to the header formatter/entropy coder (590).

In the scaler/inverse transformer (535) a scaler/inverse quantizer performs inverse scaling and inverse quantization on the quantized transform coefficients. An inverse frequency transformer performs an inverse frequency transform, producing blocks of reconstructed prediction residuals or sample values. The encoder (500) combines reconstructed residuals with values of the prediction (558) (e.g., motion-compensated prediction values, intra-picture prediction values) to form the reconstruction (538).

For intra-picture prediction, the values of the reconstruction (538) can be fed back to the intra-picture estimator (540) and intra-picture predictor (545). Also, the values of the reconstruction (538) can be used for motion-compensated prediction of subsequent pictures. The values of the reconstruction (538) can be further filtered. A filtering control (560) determines how to perform deblock filtering and sample adaptive offset ("SAO") filtering on values of the reconstruction (538), for a given picture of the video signal (505). The filtering control (560) produces filter control data (562), which is provided to the header formatter/entropy coder (590) and merger/filter(s) (565).

In the merger/filter(s) (565), the encoder (500) merges content from different tiles into a reconstructed version of the picture. The encoder (500) selectively performs deblock filtering and SAO filtering according to the filter control data (562), so as to adaptively smooth discontinuities across boundaries in the frames. Tile boundaries can be selectively filtered or not filtered at all, depending on settings of the encoder (500), and the encoder (500) may provide syntax within the coded bitstream to indicate whether or not such filtering was applied. The decoded picture buffer (570) buffers the reconstructed current picture for use in subsequent motion-compensated prediction.

The header formatter/entropy coder (590) formats and/or entropy codes the general control data (522), quantized transform coefficient data (532), intra prediction data (542) and packed index values, motion data (552) and filter control data (562). For example, the header formatter/entropy coder (590) uses context-adaptive binary arithmetic coding ("CABAC") for entropy coding of various syntax elements of a coefficient coding syntax structure.

The header formatter/entropy coder (590) provides the encoded data in the coded video bitstream (595). The format of the coded video bitstream (595) can be a variation or extension of HEVC format, Windows Media Video format, VC-1 format, MPEG-x format (e.g., MPEG-1, MPEG-2, or MPEG-4), H.26x format (e.g., H.261, H.262, H.263, H.264), or another format.

Depending on implementation and the type of compression desired, modules of the encoder can be added, omitted, split into multiple modules, combined with other modules, and/or replaced with like modules. In alternative embodiments, encoders with different modules and/or other configurations of modules perform one or more of the described techniques. Specific embodiments of encoders typically use a variation or supplemented version of the encoder (500). The relationships shown between modules within the encoder (500) indicate general flows of information in the encoder; other relationships are not shown for the sake of simplicity.

VI. Example Video Decoders

Figure 6:
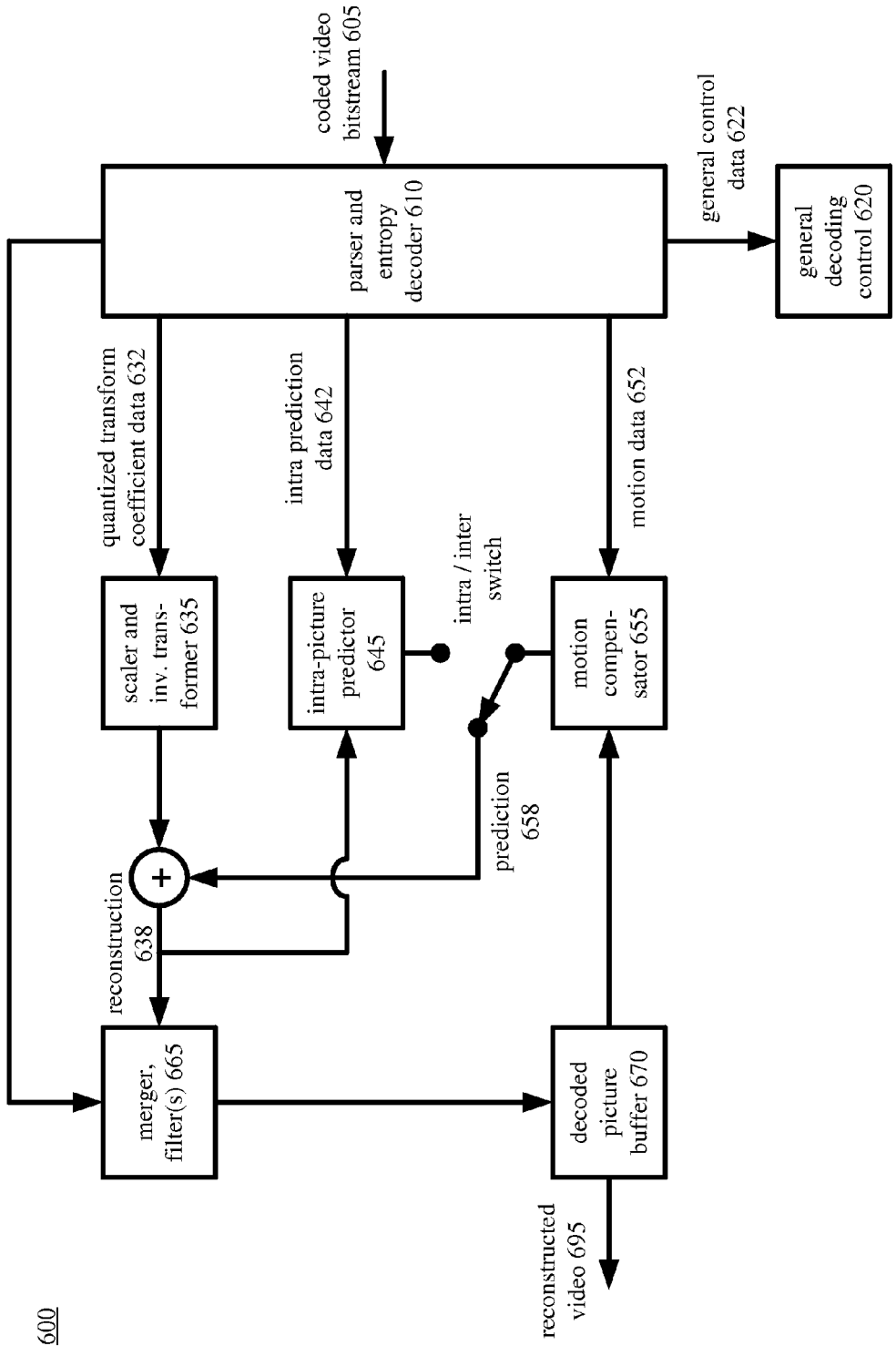
FIG. 6 is a diagram illustrating an example video decoder in conjunction with which some described embodiments can be implemented.

FIG. 6 is a block diagram of a generalized decoder (600) in conjunction with which several described embodiments may be implemented. The decoder (600) receives encoded data in a coded video bitstream (605) and produces output including pictures for reconstructed video (695). The format of the coded video bitstream (605) can be a variation or extension of HEVC format, Windows Media Video format, VC-1 format, MPEG-x format (e.g., MPEG-1, MPEG-2, or MPEG-4), H.26x format (e.g., H.261, H.262, H.263, H.264), or another format.

The decoder (600) is block-based and uses a block format that depends on implementation. Blocks may be further sub-divided at different stages. For example, a picture can be divided into 64×64 blocks, 32×2 blocks or 16×16 blocks, which can in turn be divided into smaller blocks of sample values. In implementations of decoding for the HEVC standard, a picture is partitioned into CTUs (CTBs), CUs (CBs), PUs (PBs) and TU (TBs).

The decoder (600) decompresses pictures using intra-picture decoding and/or inter-picture decoding. Many of the components of the decoder (600) are used for both intra-picture decoding and inter-picture decoding. The exact operations performed by those components can vary depending on the type of information being decompressed.

A buffer receives encoded data in the coded video bitstream (605) and makes the received encoded data available to the parser/entropy decoder (610). The parser/entropy decoder (610) entropy decodes entropy-coded data, typically applying the inverse of entropy coding performed in the encoder (500) (e.g., context-adaptive binary arithmetic decoding). For example, the parser/entropy decoder (610) uses context-adaptive binary arithmetic decoding for entropy decoding of various syntax elements of a coefficient coding syntax structure. As a result of parsing and entropy decoding, the parser/entropy decoder (610) produces general control data (622), quantized transform coefficient data (632), intra prediction data (642) and packed index values, motion data (652) and filter control data (662).

The general decoding control (620) receives the general control data (622) and provides control signals (not shown) to other modules (such as the scaler/inverse transformer (635), intra-picture predictor (645), motion compensator (655) and intra/inter switch) to set and change decoding parameters during decoding.

If the current picture is predicted using inter-picture prediction, a motion compensator (655) receives the motion data (652), such as motion vector data and reference picture selection data. The motion compensator (655) applies motion vectors to the reconstructed reference picture(s) from the decoded picture buffer (670). The motion compensator (655) produces motion-compensated predictions for inter-coded blocks of the current picture. The decoded picture buffer (670) stores one or more previously reconstructed pictures for use as reference pictures.

In a separate path within the decoder (600), the intra-prediction predictor (645) receives the intra prediction data (642), such as information indicating whether intra prediction uses spatial prediction or one of the dictionary modes (e.g., a flag value per intra block or per intra block of certain prediction mode directions), prediction mode direction (for intra spatial prediction). For intra spatial prediction, using values of a reconstruction (638) of the current picture, according to prediction mode data, the intra-picture predictor (645) spatially predicts sample values of a current block of the current picture from neighboring, previously reconstructed sample values of the current picture.

For the transform coefficient level gradual updating techniques described herein, the decoder (600) can decode a frame using a subset of available quantized transform coefficients for blocks of the frame (e.g., where the quantized transform coefficients for the blocks are indicated by a coefficient cutoff marker) and reconstruct the frame. Subsequent frames can provide other subsets of the available quantized transform coefficients for corresponding blocks (e.g., a next portion of the quantized transform coefficients in an order according to a scan pattern) which can be decoded and used with the previously decoded transform coefficients to reconstruct the subsequent frames.

The intra/inter switch selects values of a motion-compensated prediction or intra-picture prediction for use as the prediction (658) for a given block. For example, when HEVC syntax is followed, the intra/inter switch can be controlled based on a syntax element encoded for a CU of a picture that can contain intra-predicted CUs and inter-predicted CUs. The decoder (600) combines the prediction (658) with reconstructed residual values to produce the reconstruction (638) of the content from the video signal.

To reconstruct the residual the scaler/inverse transformer (635) receives and processes the quantized transform coefficient data (632). In the scaler/inverse transformer (635), a scaler/inverse quantizer performs inverse scaling and inverse quantization on the quantized transform coefficients. An inverse frequency transformer performs an inverse frequency transform, producing blocks of reconstructed prediction residuals or sample values. For example, the inverse frequency transformer applies an inverse block transform to frequency transform coefficients, producing sample value data or prediction residual data. The inverse frequency transform can be an inverse DCT, an integer approximation thereof, or another type of inverse frequency transform.

For intra-picture prediction, the values of the reconstruction (638) can be fed back to the intra-picture predictor (645). For inter-picture prediction, the values of the reconstruction (638) can be further filtered. In the merger/filter(s) (665), the decoder (600) merges content from different tiles into a reconstructed version of the picture. The decoder (600) selectively performs deblock filtering and SAO filtering according to the filter control data (662) and rules for filter adaptation, so as to adaptively smooth discontinuities across boundaries in the frames. Tile boundaries can be selectively filtered or not filtered at all, depending on settings of the decoder (600) or a syntax indication within the encoded bitstream data. The decoded picture buffer (670) buffers the reconstructed current picture for use in subsequent motion-compensated prediction.

The decoder (600) can also include a post-processing deblock filter. The post-processing deblock filter optionally smoothes discontinuities in reconstructed pictures. Other filtering (such as de-ring filtering) can also be applied as part of the post-processing filtering.

Depending on implementation and the type of decompression desired, modules of the decoder can be added, omitted, split into multiple modules, combined with other modules, and/or replaced with like modules. In alternative embodiments, decoders with different modules and/or other configurations of modules perform one or more of the described techniques. Specific embodiments of decoders typically use a variation or supplemented version of the decoder (600). The relationships shown between modules within the decoder (600) indicate general flows of information in the decoder; other relationships are not shown for the sake of simplicity.

VII. Prior Art Progressive Updating

This section describes prior art solutions for performing progressive updating or scalable updating. In one prior art technique, gradual decoder refresh (GDR) is utilized in which coded picture content is recovered gradually in more than one coded picture, as described in JVT-B063 (Gary Sullivan, "On Random Access and Bitstream Format for JVT Video," Joint Video Team (JVT) of ISO/IEC MPEG & ITU-T VCEG, 2nd Meeting: Geneva, CH, Jan. 29-Feb. 1, 2002). The GDR technique can allow random access capabilities at non-intra frames. However, with the GDR technique, only a limited region of the coded picture is available for display using any given frame, and all frames must be received in order to be able to decode and display the entire area (e.g., the first frame may contain intra macroblocks for only the top row of macroblocks and thus display of the first frame would only display content for the first row of macroblocks, the second frame may contain intra macroblocks for only the second row of macroblocks and thus display of the second frame would only display content for the first two rows of macroblocks, and so on). In addition, with the GDR technique, refreshing is only performed using intra coding which increases the cost in terms of bits needed to code the content.

In another prior art technique, the scalable video coding (SVC) extension of the H.264/AVC video coding standard seeks to provide flexible rate adaption through temporal, spatial, and quality scalability modes. With the SVC quality scalability mode, a base layer of a frame is coded at a lower quality while an enhancement layer (or multiple enhancement layers) is coded at higher quality. A decoder can decode the base layer and display a lower quality frame or also decode the enhancement layer (or multiple enhancement layers) to achieve higher quality.

VIII. Transform Coefficient Level Gradual Updating

This section presents various innovations in gradual updating using transform coefficients. For example, transform coefficient level gradual updating can be applied by encoding (or decoding) only a subset of the transform coefficients for the blocks, macroblocks, or other coding unit of a given picture (e.g., a frame or a field). In this way, a first subset of the transform coefficients for the block, macroblock, or other coding unit, can be sent with a first picture, a second subset can be sent in a second picture, and so on (e.g., until all transform coefficients have been sent). The number of transform coefficients to encode (or decode) can be determined based on available bandwidth (e.g., based on a model of available bandwidth, which can also take into account a desired quantization parameter value).

For example, encoding video or image data for a picture can comprise performing a frequency transform on data values (e.g., prediction residual data values or sample values) for the blocks of the picture to produce a set of transform coefficients, selecting a subset of the set of transform coefficients (e.g., based on a model of available bandwidth), and encoding the subset of the set of transform coefficients (e.g., after applying quantization) to produce encoded data for the picture (e.g., in an output bitstream). Other encoding operations can be performed as well (e.g., motion compensation, inter/intra prediction, etc.). Encoding video or image data for one or more subsequent pictures can be performed by selecting other subsets of the set of transform coefficients. For example, a first portion of the transform coefficients of the blocks of a first video picture can be encoded, followed by a second portion of the transform coefficients of the blocks of a second video picture, and so on until all of the transform coefficients of the blocks have been encoded (e.g., transform coefficients for all transform coefficient positions or locations in scan pattern order).

The encoded data for a picture can be decoded by receiving quantized transform coefficients for the blocks of the picture that are a subset of available quantized transform coefficients for the blocks, and performing inverse quantization and inverse frequency transform operations. The blocks of the picture can then be reconstructed (e.g., by performing additional decoding operations using block data values resulting from the inverse frequency transform). For example, a first portion of quantized transform coefficients can be received for the blocks of a first picture and the first picture can be reconstructed using the first portion of the quantized transform coefficients (e.g., at a reduced quality). A second portion of the quantized transform coefficients (e.g., for a second set of transform coefficient positions or locations in scan pattern order) can be received for the blocks of a second picture and the second picture can be reconstructed using the first portion of the quantized transform coefficients as well as the second portion of the quantized transform coefficients (e.g., at an increased quality in comparison to the first picture). In some implementations, where the transform is additive (where the inverse transform coefficients, or reconstructed pixels, can be added to the first inverse transform coefficients), the first portion of the transform coefficients do not need to be stored for use when decoding the second picture.

The transform coefficient level gradual updating techniques can be applied to encoding or decoding of various types of video and image content. In some implementations, transform coefficient level gradual updating is applied to encoding and decoding of screen content. For example, with screen content, the content may remain the same from one picture to the next (e.g., from one frame or image to the next). For example, screen content representing a graphical user interface may remain the same from one frame to the next unless manipulation of the user interface occurs (e.g., opening a window, typing text, launching an application, etc.). In such situations where content of a picture (or a portion of a picture) remains the same (or nearly the same) from one picture to the next, transform coefficient level gradual updating can be applied to efficiently encode (and decode) only a portion of the transform coefficients of the blocks in each picture (e.g., all the blocks of each picture or fewer than all the blocks of each picture such as only those blocks with content that remains the same or nearly the same from one picture to the next). Reconstruction of the picture can be performed when only the first picture is received, with subsequent pictures providing additional portions of the available transform coefficients for reconstructing the picture with increased quality. In other words, the transform coefficients can be supplemented for a stationary block (e.g., content at a particular block location that remains the same, or nearly the same, from picture to picture) over a sequence of pictures. For example, because the content is the same (or nearly the same), different subsets of transform coefficients from corresponding blocks across multiple pictures can be encoded and decoded. The technologies described herein can also be applied to content other than screen content (e.g., other types of content that remains the same, or nearly the same, from one picture to the next).

In some implementations, the number of transform coefficients selected for each block of a picture is the same. Consider an example of a first picture encoded using 8×8 blocks. If 15 transform coefficients are selected for the picture (e.g., based on available bandwidth), then each block would encode 15 of that block's transform coefficients (e.g., the first 15 transform coefficients of a given block according to the scan pattern). The next picture would encode the next N transform coefficients of each block (e.g., the next 18 transform coefficients or some other number of the next transform coefficients), and so on.

In some implementations, the number of transform coefficients can vary from block to block (or from coding unit to coding unit). For example, a first block (or first group of blocks or other content area) of a first picture can encode the first N transform coefficients while a second block (or second group of blocks or other content area) can encode the first M transform coefficients (where N is different from M).

Depending on the number of transform coefficients selected for each block or each picture, a different number of pictures may be needed to send all transform coefficients (transform coefficients for all transform coefficient locations or positions). For example, if available bandwidth is low, then only a small subset of available transform coefficients may be selected for sending with each picture, and as a result a large number of pictures would be needed to send all subsets of transform coefficients (e.g., 20 pictures). On the other hand, if available bandwidth is high, then a large subset of available transform coefficients may be selected for sending with each picture, and as a result a small number of pictures would be needed to send all subsets of transform coefficients (e.g., 2 or 3 pictures).

In some implementations, transform coefficient level gradual updating techniques are applied to only those blocks of a sequence of pictures whose content does not change. For example, for a sequence of pictures, the blocks at a particular set of locations where content is not changing between the pictures of the sequence can be coded using transform coefficient level gradual updating, while blocks at a different set of locations where content is changing between the pictures can be coded without using transform coefficient level gradual updating. Various techniques can be used to determine whether content at a particular block location is changing from one picture to the next (e.g., in some implementations sample values, such as one or more of Y, U, and V sample values, are compared to determine whether they are the same, in some implementations, quantized coefficient values are compared to determine whether they are the same, etc.). For example, it is possible that transform coefficient level gradual updating is not applied to areas of the content that change in subsequent pictures, and it is only for blocks for which there is no change in subsequent pictures that all transform coefficients are gradually encoded (over the sequence of pictures) to achieve a high level of quality (e.g., using a maximum quality quantization parameter). For example, an encoder can encode all blocks of a first picture using transform coefficient level gradual updating and then only continue using transform coefficient level gradual updating for those block in subsequent pictures whose content remains the same, and switch to another encoding mode for any block locations whose content does change.

The transform coefficient level gradual updating techniques described herein can provide improved coding efficiency and improved picture quality in certain coding situations. For example, sending only a subset of transform coefficients in a given picture can provide consistent encoding and decoding performance as well as consistent and predictable bandwidth utilization (e.g., according to available bandwidth) Improved picture quality can be provided by encoding all transform coefficients over a sequence of pictures (with a separate subset encoded in each picture) so that a decoder can eventually reconstruct the picture using all transform coefficients. In addition, improved picture quality can be provided by encoding each subset of transform coefficients with high quality (e.g., a high quality QP value).

A. Example Scan Patterns

In some implementations, transform coefficient level gradual updating techniques are applied to select a subset of the available transform coefficients to encode for a particular block (or other coding unit) taking into account the scan pattern used to scan the transform coefficients.

FIG. 7 is a diagram 700 illustrating example prior art scan patterns for a block of transform coefficients. In the diagram 700, a block of transform coefficients 710 is depicted for an 8×8 block of video or image data. The block of transform coefficients 710 can be generated, for example, by applying a frequency transform (e.g., a DCT or another type of frequency transform) to prediction residual data values or sample data values of the block. In the block of transform coefficients 710, the 64 individual transform coefficient positions or locations are labeled "T00" to "T63."

Depending on various criteria (e.g., the type of content being coded, encoder and decoder complexity, type of frequency transform used, entropy coding method, etc.), the transform coefficients are ordered according to a scan pattern. The diagram 700 depicts two example scan patterns. A zig-zag scan pattern 720 is depicted in which the transform coefficients are ordered according to a zig-zag pattern. A horizontal scan pattern 730 is also depicted in which the transform coefficients are ordered horizontally (row-by-row). In other implementations, additional or different scan patterns may be used than those depicted in the diagram 700.

B. Transform Coefficient Level Gradual Updating Examples

FIG. 8 is a diagram 800 illustrating an example of transform coefficient level gradual updating for a particular block over a sequence of frames using the example zig-zag scan pattern 720. As depicted in the diagram 800, a particular 8×8 block of transform coefficients of a first picture 810 (e.g., a first frame or first image) is encoded. During the encoding process a subset, or portion, of the transform coefficients are selected for encoding (the transform coefficients labeled "TNN" are encoded in the first picture, while the transform coefficients labeled "0" are not encoded for the first picture). For example, the number of transform coefficients in the subset can be selected based on a model of available bandwidth. Other selection criteria can also be used (e.g., a pre-defined, or user-configured, number of transform coefficients can be selected). As depicted, 10 transform coefficients have been selected in this example for the first picture 810. Because the zig-zag scan pattern 720 is being used in this example, the 10 transform coefficients are selected according to the zig-zag scan pattern 720 order (T00, T01, T08, T16, T09, T02, T03, T10, T17, and T24). Depending on the selection criteria used (e.g., the model of available bandwidth), more or fewer transform coefficients may be selected for the first picture.

As depicted in the diagram 800, a corresponding 8×8 block (an 8×8 block at the same location as the 8×8 block in the first picture) of transform coefficients of a second picture 820 is encoded. For the corresponding 8×8 block, a second subset, or second portion, of the transform coefficients are selected for encoding (transform coefficients at a second subset of transform coefficient positions or locations). The transform coefficients labeled "TNN" are encoded in the second picture, while the transform coefficients labeled "0" are not encoded for the second picture and the transform coefficients with a diagonal line represent those that have been encoded in one or more previous pictures. As depicted, the next 11 transform coefficients in the zig-zag scan pattern 720 order have been selected in this example for the second picture 820. Depending on the selection criteria used (e.g., the model of available bandwidth), more or fewer transform coefficients may be selected for the second picture.

As depicted in the diagram 800, a corresponding 8×8 block (an 8×8 block at the same location as the 8×8 block in the first and second pictures) of transform coefficients of a third picture 830 is encoded. For the corresponding 8×8 block, a third subset, or third portion, of the transform coefficients are selected for encoding (transform coefficients at a third subset of transform coefficient positions or locations). The transform coefficients labeled "TNN" are encoded in the third picture, while the transform coefficients labeled "0" are not encoded for the third picture and the transform coefficients with a diagonal line represent those that have been encoded in one or more previous pictures. As depicted, the next 22 transform coefficients in the zig-zag scan pattern 720 order have been selected in this example for the third picture 830. Depending on the selection criteria used (e.g., the model of available bandwidth), more or fewer transform coefficients may be selected for the third picture.

As depicted in the diagram 800, a corresponding 8×8 block (an 8×8 block at the same location as the 8×8 block in the first, second, and third pictures) of transform coefficients of a fourth picture 840 is encoded. For the corresponding 8×8 block, a fourth subset, or fourth portion, of the transform coefficients are selected for encoding (transform coefficients at a fourth subset of transform coefficient positions or locations). The transform coefficients labeled "TNN" are encoded in the fourth picture, while the transform coefficients with a diagonal line represent those that have been encoded in one or more previous pictures. As depicted, the next 21 transform coefficients in the zig-zag scan pattern 720 order have been selected in this example for the fourth picture 840. Depending on the selection criteria used (e.g., the model of available bandwidth), more or fewer transform coefficients may be selected for the fourth picture.

In the example scenario depicted in FIG. 8, all of the transform coefficients for the block are sent in four pictures (all of the transform coefficient locations or positions have been encoded over the sequence of four pictures). However, other encoding situations may send the transform coefficients in more, or fewer, pictures.

In some coding situations, use of a zig-zag pattern can provide improved picture quality when using coefficient level gradual updating. For example, after the frequency transform (e.g., DCT), most of the information may be concentrated in the upper-left transform coefficients. Therefore, by selecting the upper-left transform coefficients for sending in the first picture (according to the zig-zag pattern), the most important information can be encoded and therefore reconstructed by the decoder and displayed first. Subsequent pictures can encode progressively less important subsets of the transform coefficients, which can be decoded to provide incrementally improved picture quality.

FIG. 9 is a diagram 900 illustrating an example of transform coefficient level gradual updating for a particular block over a sequence of frames using the example horizontal scan pattern 730. As depicted in the diagram 900, a particular 8×8 block of transform coefficients of a first picture 910 (e.g., a first frame or first image) is encoded. During the encoding process a subset, or portion, of the transform coefficients are selected for encoding (the transform coefficients at positions or locations labeled "TNN" are encoded in the first picture, while the transform coefficients labeled "0" are not encoded for the first picture). For example, the number of transform coefficients in the subset can be selected based on a model of available bandwidth. Other selection criteria can also be used (e.g., a pre-defined, or user-configured, number of transform coefficients can be selected). As depicted, 21 transform coefficients have been selected in this example for the first picture 910. Because the horizontal scan pattern 730 is being used in this example, the 21 transform coefficients are selected according to the horizontal scan pattern 730 order (T00 through T20). Depending on the selection criteria used (e.g., the model of available bandwidth), more or fewer transform coefficients may be selected for the first picture.

As depicted in the diagram 900, the corresponding block of the second picture 920 encodes the next 21 transform coefficients (T21 through T41) and the corresponding block of the third picture 930 encodes the remaining 22 transform coefficients (T42 through T63).

In the example scenario depicted in FIG. 9, all of the transform coefficients for the block are sent in three pictures. However, other encoding situations may send the transform coefficients in more, or fewer, pictures.

In the example scenarios depicted in FIGS. 8 and 9, the example block is an 8×8 block with 64 transform coefficients. However, the technologies described herein can be applied to other block sizes, such as 4×4 blocks and 16×16 blocks, and to macroblocks and other coding units.

C. Coefficient Cutoff Marker

In some implementations, the number of transform coefficients that are coded for a given block (other coding unit) are encoded as a syntax element that can be called a coefficient cutoff marker. The coefficient cutoff marker can indicate the number of transform coefficients encoded for a particular block (or other coding unit) using a numerical value. For example, if 12 transform coefficients are encoded for a particular block, then the coefficient cutoff marker can indicate the number 12 (e.g., as an entropy coded value or encoded using another coding technique). The coefficient cutoff marker can also indicate the number of transform coefficients encoded for a particular block (or other coding unit) by indicating an ending position of the transform coefficients. For example, the coefficient cutoff marker for the 8×8 block of the first picture 810 could encode an identifier for, or a position of, the T24 coefficient (the last transform coefficient encoded for the block according to the zig-zag scan pattern 720), the coefficient cutoff marker for the 8×8 block of the second picture 810 could encode an identifier for, or a position of, the T40 coefficient (the last transform coefficient encoded for the second block according to the zig-zag scan pattern 7200, and so on.

In some implementations, the coefficient cutoff marker is encoded at block-level. For example, the coefficient cutoff marker can be encoded along with the encoded coefficient data for the block or in a block header. In some implementations, the coefficient cutoff marker is encoded at picture-level. For example, the coefficient cutoff marker can be encoded in a picture header and used for all blocks of the picture. For example, the coefficient cutoff marker can be encoded in a supplemental enhancement information (SEI) message at picture level and/or at region level.

Figure 10:
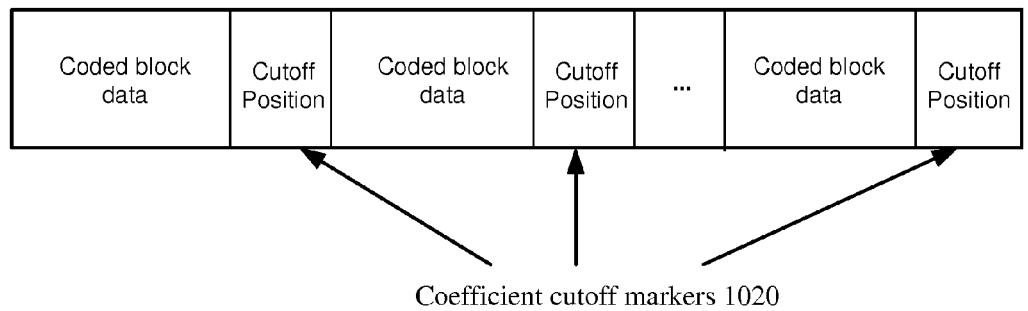
FIG. 10 is a diagram illustrating coded block data for blocks of a picture, including coefficient cutoff markers.

FIG. 10 is a diagram 1000 illustrating coded block data for blocks of a picture 1010, including coefficient cutoff markers 1020. As depicted in the diagram 1000, coded block data is depicted for a number of blocks of a picture 1010. A coefficient cutoff marker is coded after the coded block data for a given block to indicate where the transform coefficients end for the given block.

D. Methods for Encoding and Decoding using Transform Coefficient Level Gradual Updating This section describes example methods for encoding and decoding using transform level gradual updating. The example methods can be applied to encoding and decoding of video data and image data.

Figure 11:
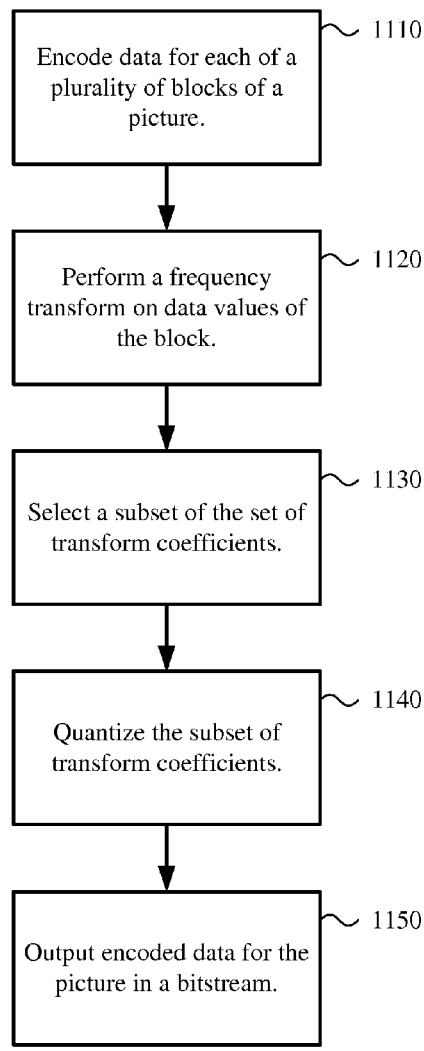
FIG. 11 is a flowchart of an example method for encoding pictures using transform coefficient level gradual updating.

FIG. 11 is an example method 1100 for video encoding or image encoding using transform coefficient level gradual updating in which different subsets of transform coefficients are encoded over a sequence of pictures. At 1110, a number of encoding operations (comprising operations 1120 through 1140) are performed for each of a plurality of blocks of a picture (e.g., a frame of video content or an image). The plurality of blocks of the picture can be all of the blocks of the picture or fewer than all of the blocks of the picture (e.g., just a specific area of the picture where block content remains the same for a sequence of pictures).

At 1120, a frequency transform is performed on data values of the block (e.g., on prediction residual data values or sample data values) to produce a set of transform coefficients. For example, the frequency transform can be a DCT or another type of frequency transform. Other types of coefficient transforms can be used as well, such as a discrete wavelet transform (DWT).

At 1130, a subset of the set of transform coefficients is selected. In some implementations, the subset is selected based on a model of available bandwidth. The following are example models that can be applied to select the number of transform coefficients based on available bandwidth: a linear model of available bits to number of coefficients, a rate-distortion model, an arithmetic coding model that relates number of coefficients to bandwidth, and a modified rho-domain rate-control model. In some implementations, the number of transform coefficients that are selected also depends on the quantization parameter that will be used to quantize the transform coefficients. In some implementations, the quantization parameter (QP) is set to a high-quality value (in a specific implementation, a QP of 22 is used).

At 1140, the subset of the set of transform coefficients is quantized. For example, the subset of the set of transform coefficients can be quantized using a high-quality QP value.

At 1150, encoded data for the picture is output in a bitstream. For example, the encoded data for the picture can be output in a bitstream according to a codec format (e.g., H.264, HEVC, etc.).

Figure 12:
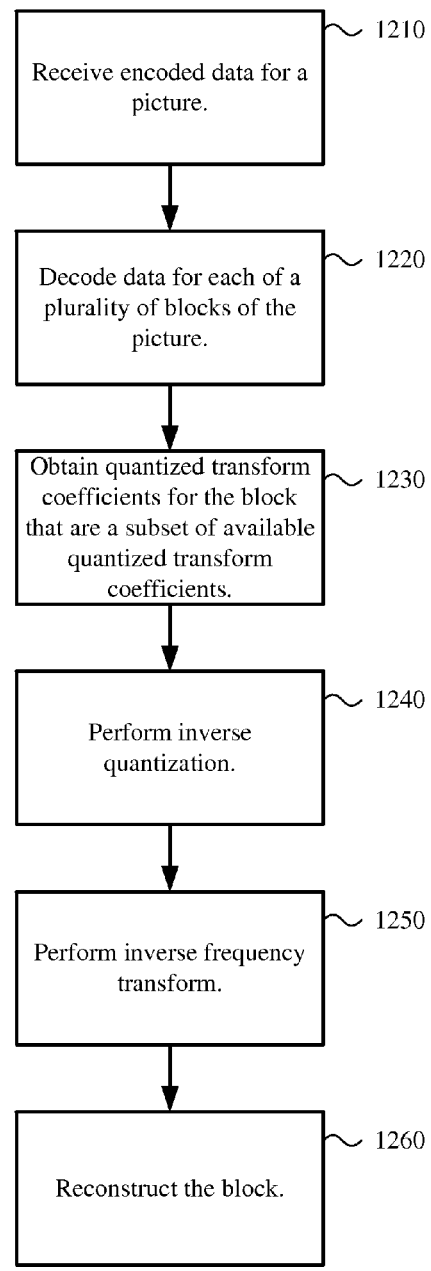
FIG. 12 is a flowchart of an example method for decoding pictures using transform coefficient level gradual updating.

FIG. 12 is an example method 1200 for video decoding or image decoding using transform coefficient level gradual updating in which different subsets of transform coefficients are decoded over a sequence of pictures. At 1210, encoded data is received for a picture in a bitstream.

At 1220, a number of decoding operations (comprising operations 1230 through 1260) are performed for each of a plurality of blocks of the picture (e.g., a frame of video content or an image). The plurality of blocks of the picture can be all of the blocks of the picture or fewer than all of the blocks of the picture (e.g., just a specific area of the picture where block content remains the same for a sequence of pictures).

At 1230, quantized transform coefficients are obtained for the block (e.g., from the bitstream) that are a subset of available quantized transform coefficients. For example, the picture may encode a first subset of available quantized transform coefficients (e.g., the first 15 quantized transform coefficients for the block, with subsequent subsets of the quantized transform coefficients being received for corresponding blocks of subsequent pictures). The number of quantized transform coefficients that are obtained for the block can be indicated by a coefficient cutoff marker (e.g., encoded at block-level or picture-level).

At 1240, inverse quantization is performed on the quantized transform coefficients for the block to produce transform coefficients. At 1250, an inverse frequency transform is performed on the transform coefficients for the block to produce block data values for the block (e.g., prediction residual data values or sample data values). For example, the inverse frequency transform can be an inverse DCT or another type of inverse frequency transform. Other types of inverse coefficient transforms can be used as well, such as an inverse discrete wavelet transform (DWT).

At 1260 the block is reconstructed using the block data values. For example, the block may be reconstructed using motion-compensated prediction values. If the quantized transform coefficients obtained at 1230 are a first subset of the available quantized transform coefficients, then the reconstruction uses just the first subset. However, if previous subsets have been received for corresponding blocks in previous pictures, then the reconstruction combines the previously received quantized transform coefficients with those received for the current block for decoding. In this way, the reconstructed block uses quantized transform coefficients received so far for decoding and reconstruction.

IX. Progressive Updating using Group of Blocks

This section presents various innovations in progressive updating on a group of blocks (GOB) basis. For example, using the progressive updating techniques described in this section, quality can be updated progressively on a group of blocks basis (e.g., instead of on the basis of an entire picture).

In some prior solutions, progressive updating has been applied on a frame basis (e.g., the scalable video coding (SVC) extension of H.264) where a first QP value is used for an entire first frame, a second QP value is used for an entire second frame, and so on. For example, a QP of 35 may be used for a first frame, a QP of 29 may be used for a second frame, a QP of 25 may be used for a third frame, a QP of 22 may be used for a fourth frame, and a QP of 20 may be used for a fifth frame.

Instead of applying progressive updating on a frame basis, the progressive updating techniques described in this section can be applied at the level of a group of blocks or to another portion of a picture (e.g., on a block or macroblock basis, or to another portion of a frame or image).

Progressive updating on a GOB basis (or to another portion of a picture) can be applied to encoding or decoding of various types of video and image content. In some implementations, progressive updating is applied to encoding and decoding of screen content. For example, with screen content, the content may remain the same from one picture to the next (e.g., from one frame or image to the next). For example, screen content representing a graphical user interface may remain the same from one frame to the next unless manipulation of the user interface occurs (e.g., opening a window, typing text, launching an application, etc.). In such situations where content of a picture (or a portion of a picture) remains the same (or nearly the same) from one picture to the next, progressive updating can be applied to progressively increase the quality of different groups of blocks over a sequence of pictures. For example, a first picture can be encoded with lower quality. For a second picture, a first portion of the groups of blocks can be encoded with a higher quality. For a third picture, a second portion of the groups of blocks can be encoded with the higher quality, and so on until all of the groups of blocks have been encoded at the higher quality. The decoder can reconstruct the content upon receiving the first picture (at the lower quality). Upon decoding the second picture, the decoder can increase the quality for those groups of blocks encoded with the higher quality in the second picture, and so on for subsequent pictures.

FIG. 13 is a diagram 1300 illustrating an example of progressive updating for groups of blocks over a sequence of pictures. For example, the progressive updating can be applied to a sequence of inter frames (e.g., P or B frames). In the sequence of pictures, the content of the pictures remains the same, or substantially the same, over the sequence of pictures (e.g., the content can be screen content that is not changing or other static video or image content). As indicated in the diagram 1300, a first picture 1310 is divided into a number of groups of blocks. All of the group of blocks (GOB) of the first picture 1310 have been encoded with a QP value of 35 (relatively low quality).

For the second picture 1320, the first three GOB have been encoded with a QP value of 22 (relatively high quality). For the third picture 1330, the next 18 GOB are encoded with the QP value of 22. For the fourth picture 1340, the remaining 14 GOB are encoded with the QP value of 22.

A decoder can receive the first picture 1310 in an encoded bitstream and reconstruct the first picture with relatively low quality. When the decoder receives the second picture 1320, the decoder can improve the quality of the first three GOB (and display the remaining GOB at the relatively low quality), and so on. Once the decoder has received all four pictures, the decoder can display all GOB at the higher quality.

The number of GOB that are encoded at the higher quality for a given picture can be determined based on available bandwidth (e.g., a model of available bandwidth, such as one of the models discussed above with regard to transform coefficient level gradual updating). Therefore, in some situations, the number of pictures needed to encode all GOB at the higher quality may be greater, or fewer, than the four pictures illustrated in the diagram 1300.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims.

What is claimed is:

1. A computing device comprising:
   a processing unit; and
   memory;
   the computing device configured to perform operations for video encoding or image encoding, the operations comprising:
   encoding data for a picture, the encoding comprising, for each block of a plurality of blocks of the picture:
      performing a frequency transform on data values of the block to produce a set of transform coefficients;
      selecting a subset of the set of transform coefficients based at least in part on a model of available bandwidth;
      quantizing the subset of the set of transform coefficients; and
      encoding, at block-level for the block, a coefficient cutoff marker indicating a number of transform coefficients in the subset of the set of transform coefficients for the block; and
   outputting encoded data for the picture in a bitstream;
   wherein one or more different subsets of the set of transform coefficients are encoded in one or more subsequent pictures for each of a plurality of corresponding blocks in the one or more subsequent pictures.

2. The computing device of claim 1 wherein the subset of the set of transform coefficients is a specific number of transform coefficients, and wherein the specific number of transform coefficients is a same number selected for all blocks of the plurality of blocks.

3. The computing device of claim 1 wherein the subset of the set of transform coefficients is a first N transform coefficients of the block according to a scan pattern.

4. The computing device of claim 1 wherein the operations are performed for video encoding, the operations further comprising:
   encoding data for a next picture, the encoding comprising, for each block of a plurality of blocks of the next picture:
      performing the frequency transform on data values of the block to produce a set of transform coefficients;
      selecting a next subset of the set of transform coefficients based at least in part on the model of available bandwidth; and
      quantizing the next subset of the set of transform coefficients; and
   outputting encoded data for the next picture in the bitstream.

5. The computing device of claim 1 wherein the plurality of blocks of the picture are a subset of all blocks of the picture, and wherein content of the plurality of blocks of the picture does not change in one or more subsequent pictures.

6. The computing device of claim 1 the operations further comprising:
   determining a specific number of transform coefficients for the subset of transform coefficients, wherein the specific number of transform coefficients is determined based on the model of available bandwidth and a quantization parameter (QP), wherein the subset of transform coefficients are quantized based on the QP.

7. The computing device of claim 1 wherein the set of transform coefficients is ordered according to a scan pattern, wherein the scan pattern is one of a zig-zag scan pattern and a horizontal scan pattern.

8. In a computing device with a video decoder or image decoder, a method comprising:
   receiving encoded data for a picture in a bit stream; and
   decoding data for the picture, the decoding comprising, for each block of a plurality of blocks of the picture:
      decoding, at block-level for the block, a coefficient cutoff marker indicating a number of quantized transform coefficients for the block;
      obtaining quantized transform coefficients for the block, wherein the quantized transform coefficients are a subset of possible quantized transform coefficients for the block, and wherein the number of the quantized transform coefficients is indicated by the coefficient cutoff marker;
      performing inverse quantization on the quantized transform coefficients for the block to produce transform coefficients for the block;
      performing an inverse frequency transform on the transform coefficients for the block to produce block data values for the block; and
      reconstructing the block using, in part, the block data values;
   wherein one or more different subsets of the possible quantized transform coefficients are decoded in one or more subsequent pictures for each of a plurality of corresponding blocks in the one or more subsequent pictures.

9. The method of claim 8 wherein a same number of quantized transform coefficients is obtained for each block of the plurality of blocks.

10. The method of claim 8 wherein the obtained quantized transform coefficients are a first N quantized transform coefficients of the block according to a scan pattern.

11. The method of claim 8 wherein the method is performed for video decoding, wherein the quantized transform coefficients are a first subset of quantized transform coefficients for the block that are decoded to produce a first subset of block data values for the block, the method further comprising:

receiving encoded data for a next picture in the bit stream; and decoding data for the next picture, the decoding comprising, for each block of a plurality of blocks of the next picture:

receiving a second subset of quantized transform coefficients for the block, wherein the second subset of quantized transform coefficients are a subset of possible quantized transform coefficients for the block different from the subset decoded for a corresponding block of the picture, and wherein a number of the second subset of quantized transform coefficients is indicated by a coefficient cutoff marker;

performing inverse quantization on the second subset of quantized transform coefficients for the block to produce a second subset of transform coefficients;

performing an inverse frequency transform on the second subset of transform coefficients for the block to produce a second subset of block data values for the block; and reconstructing the block using both:
the second subset of block data values for the block of the next picture; and
the first subset of block data values for the corresponding block of the picture.

12. The method of claim 8 wherein the inverse frequency transform is an inverse discrete cosine transform (DCT).

13. A computer-readable storage medium storing computer-executable instructions for causing a computing device to perform operations for video encoding or image encoding, the operations comprising:

encoding data for a picture, the encoding comprising, for each block of a plurality of blocks of the picture:

performing a frequency transform on data values of the block to produce a set of transform coefficients, wherein the set of transform coefficients is ordered according to a scan pattern, wherein the scan pattern is one of a zig-zag scan pattern and a horizontal scan pattern;

selecting a subset of the set of transform coefficients based at least in part on a model of available bandwidth; and quantizing the subset of the set of transform coefficients;

encoding, at block-level for the block, a coefficient cutoff marker indicating a number of transform coefficients in the subset of the set of transform coefficients for the block; and outputting encoded data for the picture in a bitstream;

wherein one or more different subsets of the set of transform coefficients are encoded in one or more subsequent pictures for each of a plurality of corresponding blocks in the one or more subsequent pictures.

14. The computer-readable storage medium of claim 13 wherein the subset of the set of transform coefficients is a specific number of transform coefficients, and wherein the specific number of transform coefficients is a same number selected for all blocks of the plurality of blocks.

15. The computer-readable storage medium of claim 13 wherein the operations are performed for video encoding, the operations further comprising:

encoding data for a next picture, the encoding comprising, for each block of a plurality of blocks of the next picture:

performing the frequency transform on data values of the block to produce a set of transform coefficients;

selecting a next subset of the set of transform coefficients based at least in part on the model of available bandwidth; and quantizing the next subset of the set of transform coefficients; and outputting encoded data for the next picture in the bitstream.

16. The computer-readable storage medium of claim 13 the operations further comprising, for each block of the plurality of blocks of the picture:

encoding a coefficient cutoff marker indicating a number of transform coefficients in the subset of the set of transform coefficients.

* * * * *